US007940443B2

(12) United States Patent
Maeno et al.

(10) Patent No.: US 7,940,443 B2
(45) Date of Patent: May 10, 2011

(54) LASER RADAR AND BEAM IRRADIATION APPARATUS THEREFOR

(75) Inventors: Yoshiaki Maeno, Mizuho (JP); Atsushi Yamaguchi, Mizuho (JP); Nobuo Iwatsuki, Anpachi-Gun (JP); Yoichiro Goto, Gifu (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 427 days.

(21) Appl. No.: 12/130,533

(22) Filed: May 30, 2008

(65) Prior Publication Data
US 2009/0051997 A1    Feb. 26, 2009

(30) Foreign Application Priority Data

May 31, 2007 (JP) ................................. 2007-146307
Jun. 1, 2007 (JP) ................................. 2007-147156
Jun. 6, 2007 (JP) ................................. 2007-149985
Oct. 4, 2007 (JP) ................................. 2007-260760

(51) Int. Cl.
*G02B 26/08*    (2006.01)

(52) U.S. Cl. .................................................. 359/212.1

(58) Field of Classification Search ............... 359/198.1, 359/202.1, 212.1, 213.1, 214.1
See application file for complete search history.

(56) References Cited

U.S. PATENT DOCUMENTS 7,262,894 B2 *    8/2007    Oettinger et al. .......... 359/213.1

FOREIGN PATENT DOCUMENTS

| JP | 11-83988 A | 3/1999 |
| WO | WO 02/08818 A1 | 1/2002 |

* cited by examiner

*Primary Examiner* — Euncha P Cherry
(74) *Attorney, Agent, or Firm* — Ditthavong Mori & Steiner, P.C.

(57) ABSTRACT

A laser radar according to an embodiment of the invention includes a beam irradiation head which emits a laser beam and a control circuit which controls the beam irradiation head to perform scan in a two-dimensional direction with the laser beam. In the laser radar, the beam irradiation head includes a laser beam source; a mirror to which the laser beam emitted from the laser beam source is incident; and a driving mechanism which rotates the mirror in first and second directions about a first rotating axis and a second rotating axis perpendicular to the first rotating axis respectively. The control circuit controls the rotation of the mirror in the first direction and the second direction such that a scan region of the laser beam becomes a rectangular shape.

18 Claims, 23 Drawing Sheets

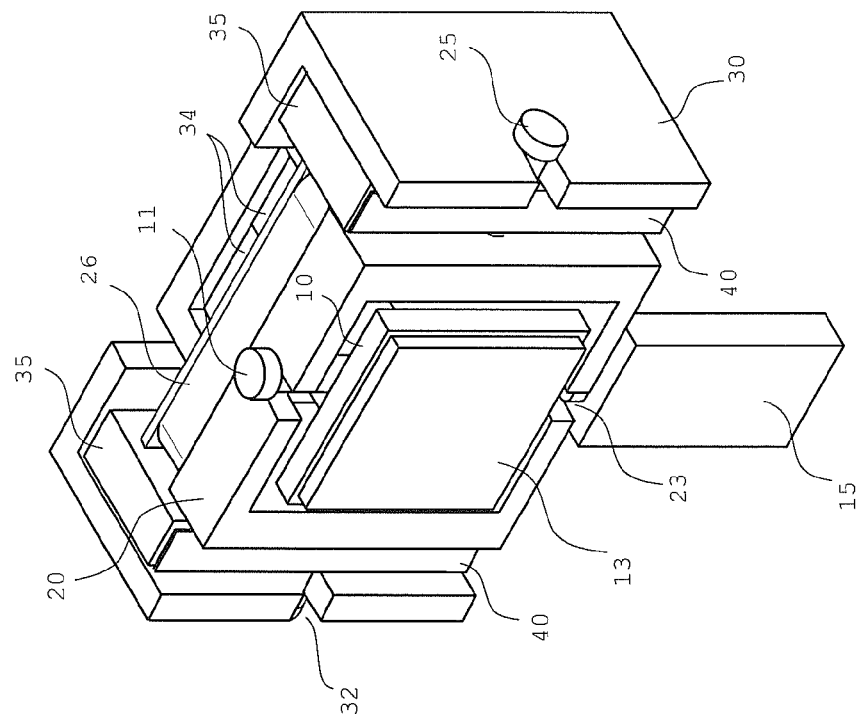
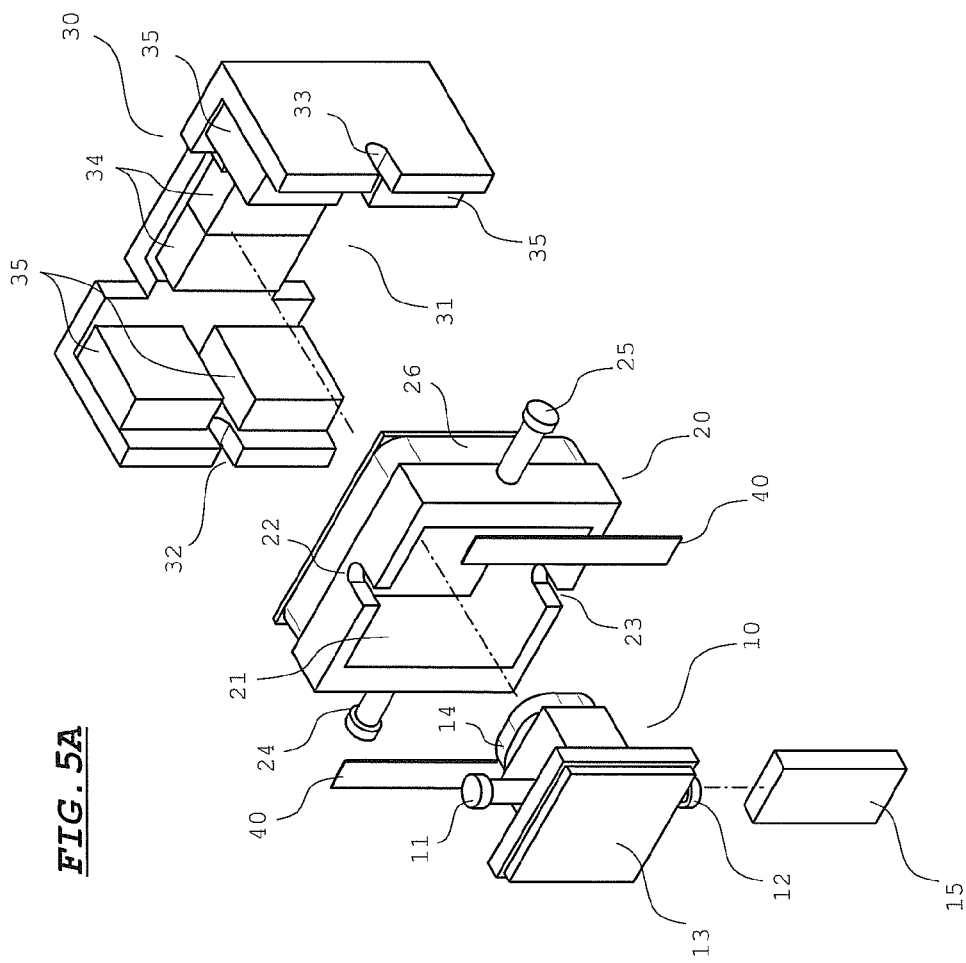

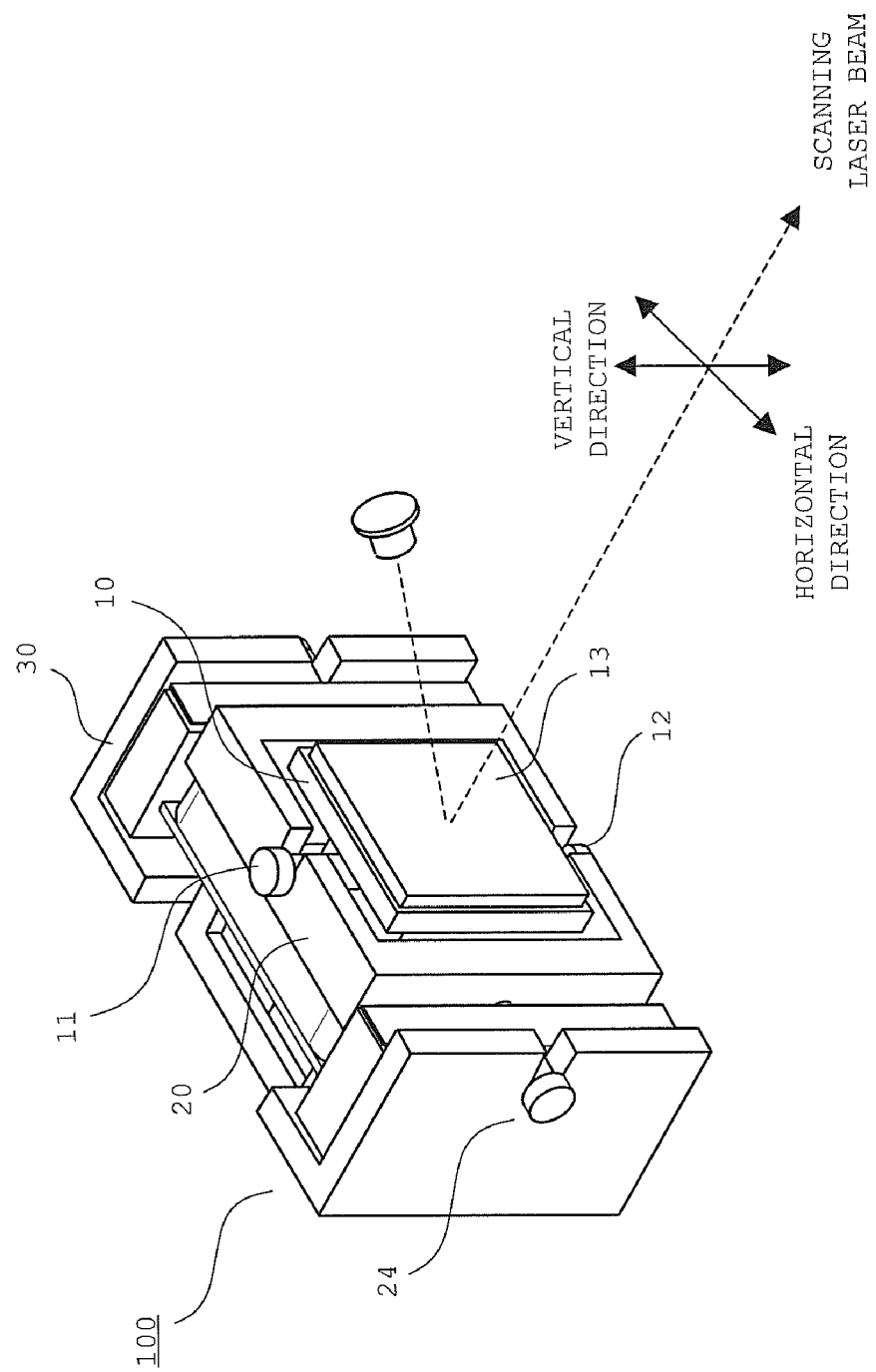

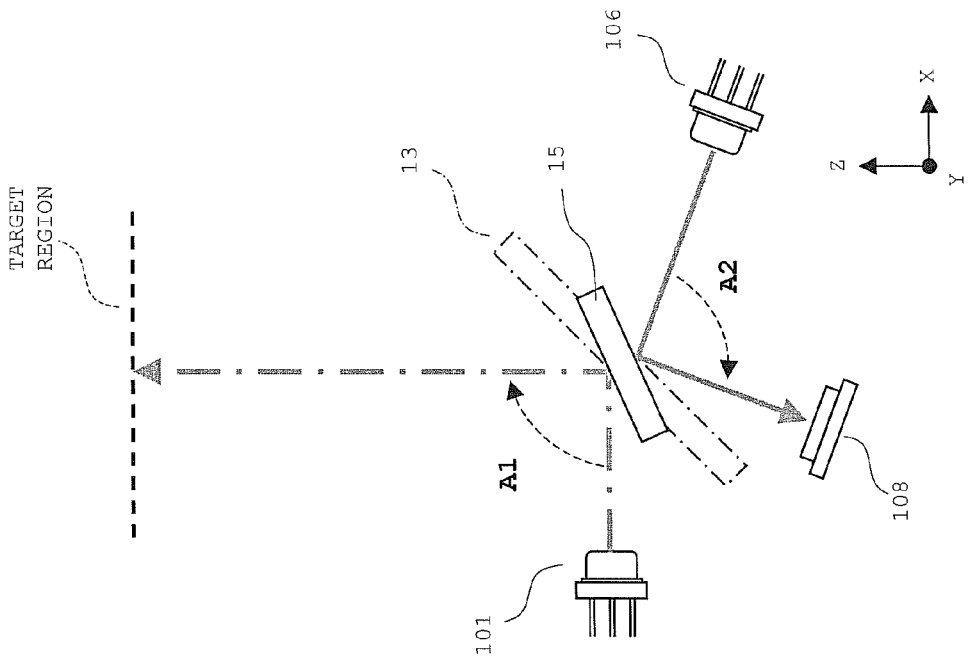
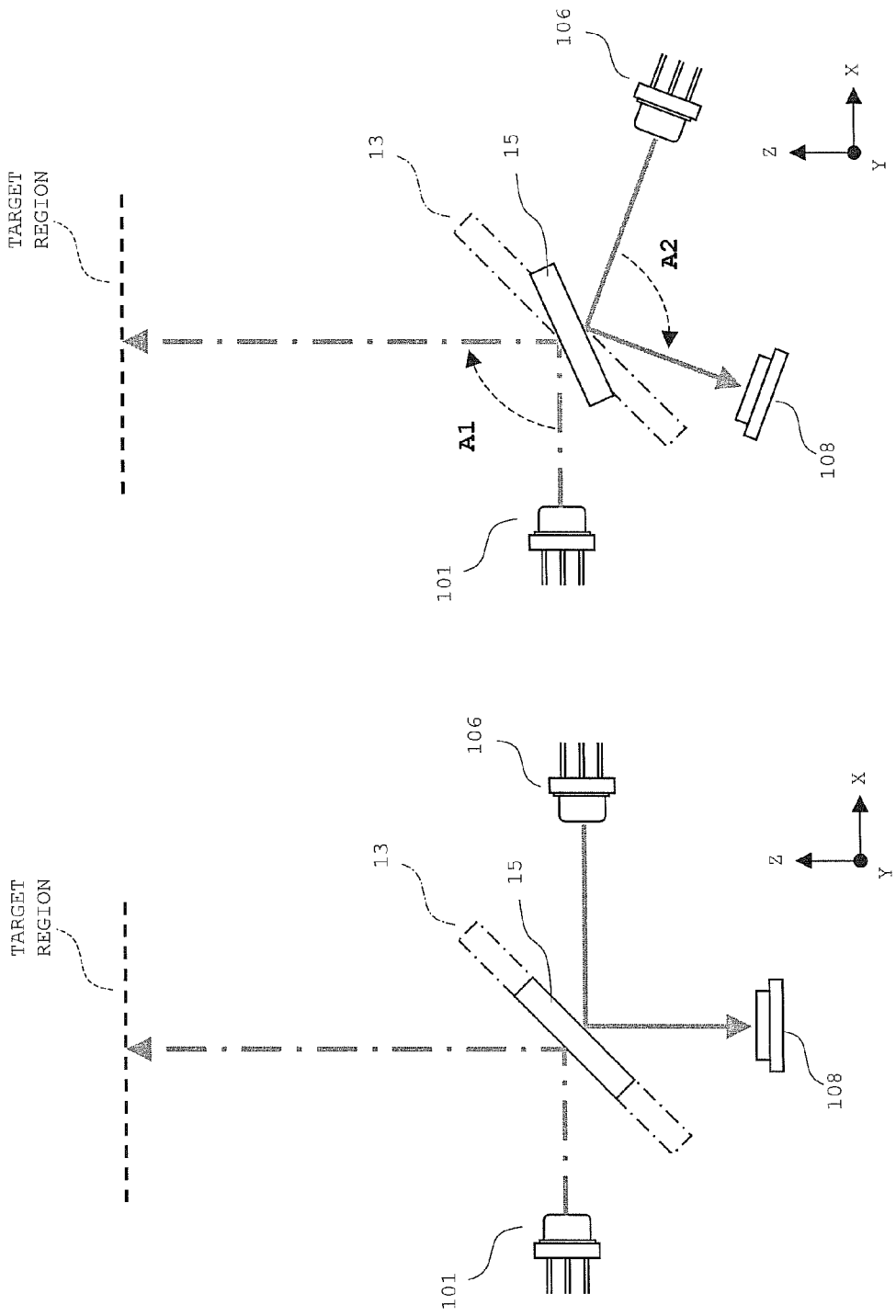
FIG. 22A
FIG. 22B

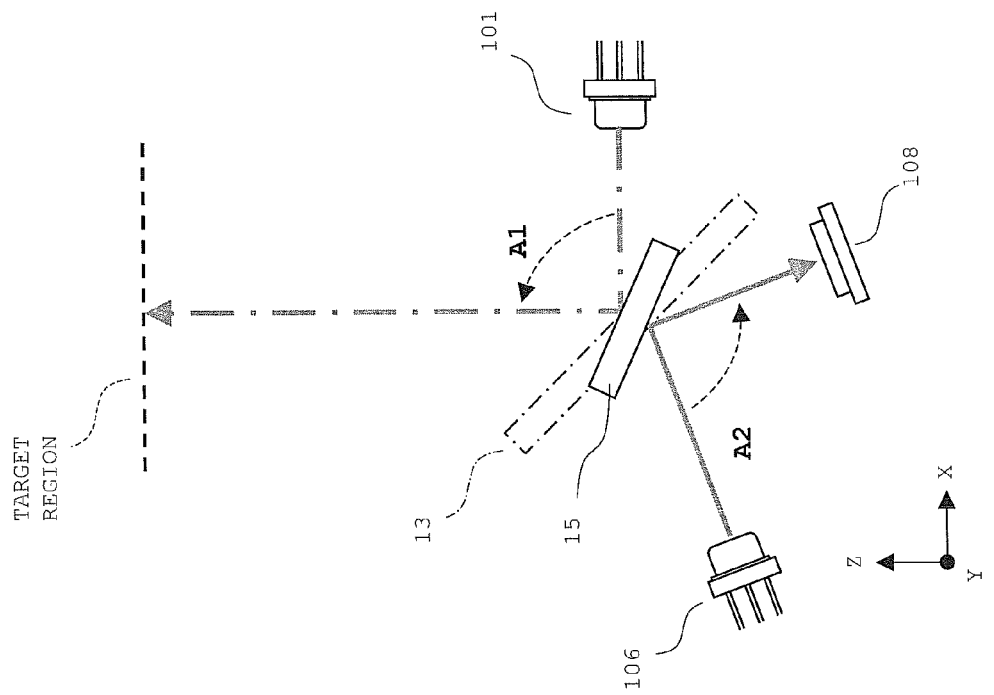
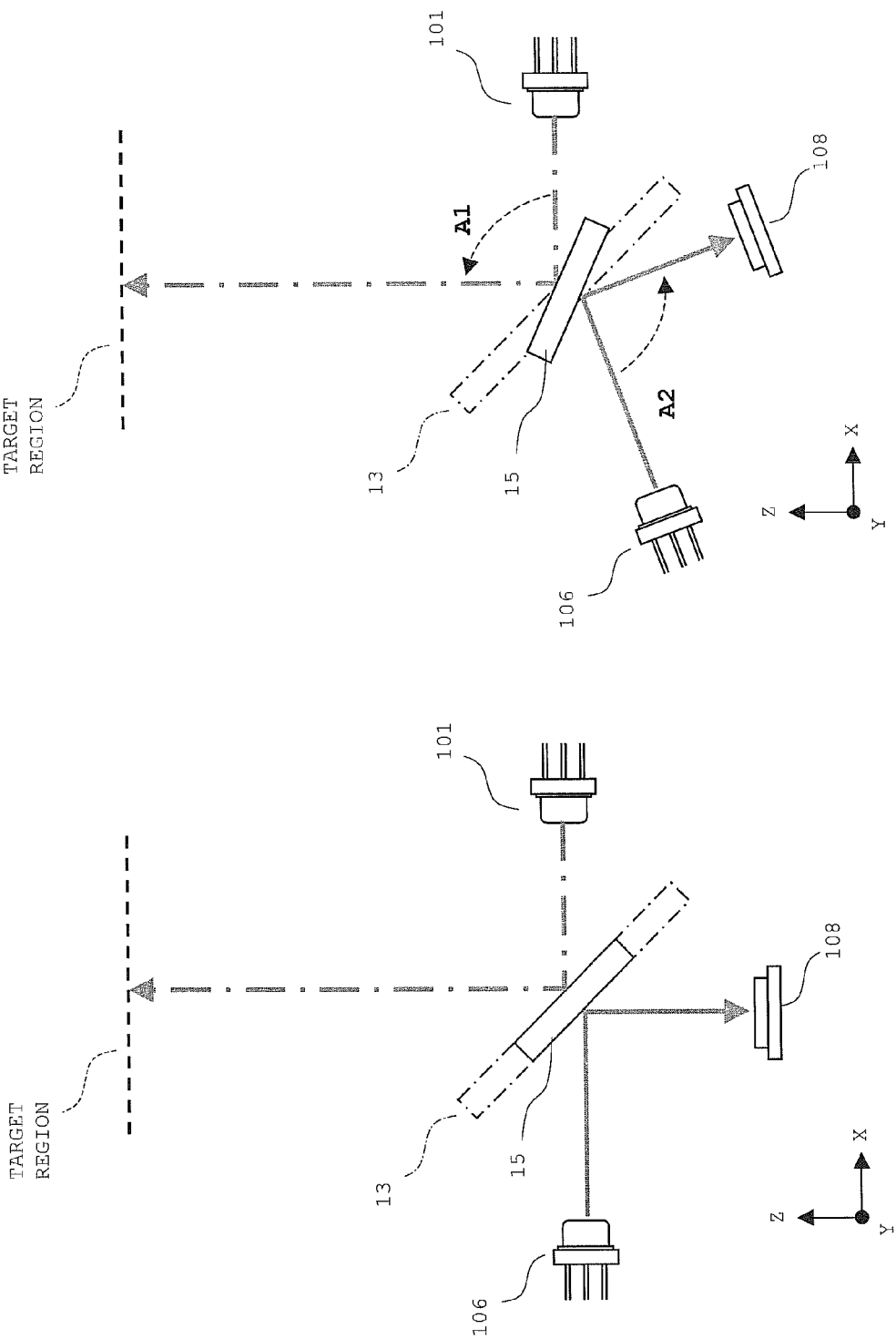

LASER RADAR AND BEAM IRRADIATION APPARATUS THEREFOR

This application claims priorities under 35 U.S.C. Section 119 of Japanese Patent Application No. 2007-146307 filed May 31, 2007, entitled "BEAM IRRADIATION APPARATUS AND LASER RADAR", Japanese Patent Application No. 2007-147156 filed Jun. 1, 2007, entitled "BEAM IRRADIATION APPARATUS AND LASER RADAR", Japanese Patent Application No. 2007-149985 filed Jun. 6, 2007, entitled "BEAM IRRADIATION APPARATUS AND LASER RADAR" and Japanese Patent Application No. 2007-260760 filed Oct. 4, 2007, entitled "BEAM IRRADIATION APPARATUS AND LASER RADAR".

BACKGROUND OF THE INVENTION

1. Field of the Invention

The present invention relates to a laser radar and a beam irradiation apparatus therefor, particularly to a vehicle-mounted laser radar and a beam irradiation apparatus therefor.

2. Description of the Related Art

Recently, the laser radar is mounted on an automobile in order to enhance safety during running. The beam irradiation apparatus which irradiates ahead with a laser beam is mounted on the laser radar, and an obstacle is detected based on existence of the reflected light when the beam irradiation apparatus irradiates ahead with the laser beam. A distance to the obstacle is measured based on a temporal difference between a laser beam emission time and a reflected light acceptance time.

At this point, means for scanning a predetermined target region with the laser beam is provided in the beam irradiation apparatus. For example, a lens driving type beam scan mechanism can be used as the means for scanning the target region. In a configuration of the lens driving type beam scan mechanism, the target region is scanned in a two-dimensional direction with the laser beam by two-dimensionally driving a beam scanning lens supported by a wire, which allows the beam scan to be realized with high reliability.

However, in the configuration, unfortunately the lens and a driving mechanism thereof are enlarged and a large driving power is necessary to drive the lens.

Alternatively, a gimbal type actuator can be used as other means for scanning the target region with the laser beam. In the gimbal method, a beam scanning mirror is rotated about two rotating axes orthogonal to each other, thereby scanning the target region in the two-dimensional direction with the laser beam. According to the gimbal type actuator, compared with the lens driving method, downsizing of the actuator can be achieved and the driving power necessary to drive the mirror can be decreased.

Generally, in the gimbal type actuator, while a rotation position of the mirror is fixed in a vertical direction, the mirror is rotated in a horizontal direction to scan the target region with the laser beam. When one-line horizontal scan is ended, the mirror is rotated by a predetermined angle in the vertical direction, and the mirror is rotated in the horizontal direction to perform the horizontal scan for the next line. The whole of target region is scanned by repeating the operation.

However, when the mirror is rotated in the horizontal direction while the rotation position of the mirror is fixed in the vertical direction, the region (hereinafter referred to as "scan region") scanned with the laser beam is formed into not a rectangular shape but a shape having an outline deformed in a longitudinal direction or a crosswise direction. On the other hand, in the laser radar, generally a rectangular (horizontally long rectangle) region is set as the scan region. Therefore, in the case where the mirror is driven in the above-described manner, because the scan region does not become the desired rectangular shape, it is a possibility that obstacle detection and the distance measurement cannot be properly performed.

SUMMARY OF THE INVENTION

A first aspect of the invention relates to a laser radar. A laser radar according to this aspect includes a beam irradiation head which emits a laser beam; and a control circuit which controls the beam irradiation head to perform scan in a two-dimensional direction with the laser beam. The beam irradiation head includes a laser beam source; a mirror to which the laser beam emitted from the laser beam source is incident; and a driving mechanism which rotates the mirror in first and second directions about a first rotating axis and a second rotating axis respectively, the second rotating axis being perpendicular to the first rotating axis. The control circuit controls the rotation of the mirror in the first direction and the second direction such that a scan region of the laser beam becomes a rectangular shape.

According to the laser radar of the first aspect, the control circuit controls the rotation of the mirror in the first direction and the second direction, whereby the scan region of the laser beam becomes the rectangular shape. Therefore, the detection can be properly performed in the target region.

A second aspect of the invention relates to a beam irradiation apparatus for a laser radar. A beam irradiation apparatus according to this aspect includes a laser beam source; a mirror to which the laser beam emitted from the laser beam source is incident; a driving mechanism which rotates the mirror in first and second directions about a first rotating axis and a second rotating axis respectively, the second rotating axis being perpendicular to the first rotating axis; and a control circuit which controls the driving mechanism to perform scan in a two-dimensional direction with the laser beam. The control circuit controls the rotation of the mirror in the first direction and the second direction such that a scan region of the laser beam becomes a rectangular shape.

A third aspect of the invention relates to a beam irradiation apparatus for a laser radar. A beam irradiation apparatus according to this aspect includes a laser beam source; a scan mirror to which the laser beam emitted from the laser beam source is incident; a driving mechanism which rotates the scan mirror in first and second directions about a first rotating axis and a second rotating axis respectively, the second rotating axis being perpendicular to the first rotating axis; a servo mirror which is rotated according to the rotation of the scan mirror; a servo light source which emits a servo light beam to the servo mirror; and a photodetector which accepts the servo light beam reflected by the servo mirror and supplies a signal according to an acceptance position of the servo light beam. The laser beam and the servo light beam are incident to the scan mirror and the servo mirror such that an angle direction from an optical axis of the laser beam incident to the scan mirror toward an optical axis of the laser beam reflected by the scan mirror matches for an angle direction from an optical axis of the servo light beam incident to the servo mirror toward an optical axis of the servo light beam reflected by the servo mirror.

By making the laser beam and the servo light beam incident to the scan mirror and the servo mirror according to the third aspect, an inclination of a scan trajectory of a servo light beam can be suppressed on the light acceptance surface when the target region is horizontally scanned with the laser beam, and the deformation of the servo light beam scan region can be suppressed.

BRIEF DESCRIPTION OF THE DRAWINGS

The above and further objects and novel features of the invention will more fully appear from the following description when the same is read with reference to the accompanying drawings:

FIGS. 5A and 5B show a configuration of a mirror actuator according to a modification of the first embodiment;

FIG. 10 shows a scanning laser beam incident direction in a second embodiment of the invention;

FIGS. 22A and 22B are views explaining another example of the configuration of the fourth embodiment; and FIGS. 23A and 23B are views explaining still another example of the configuration example of the fourth embodiment.

Figure 1:
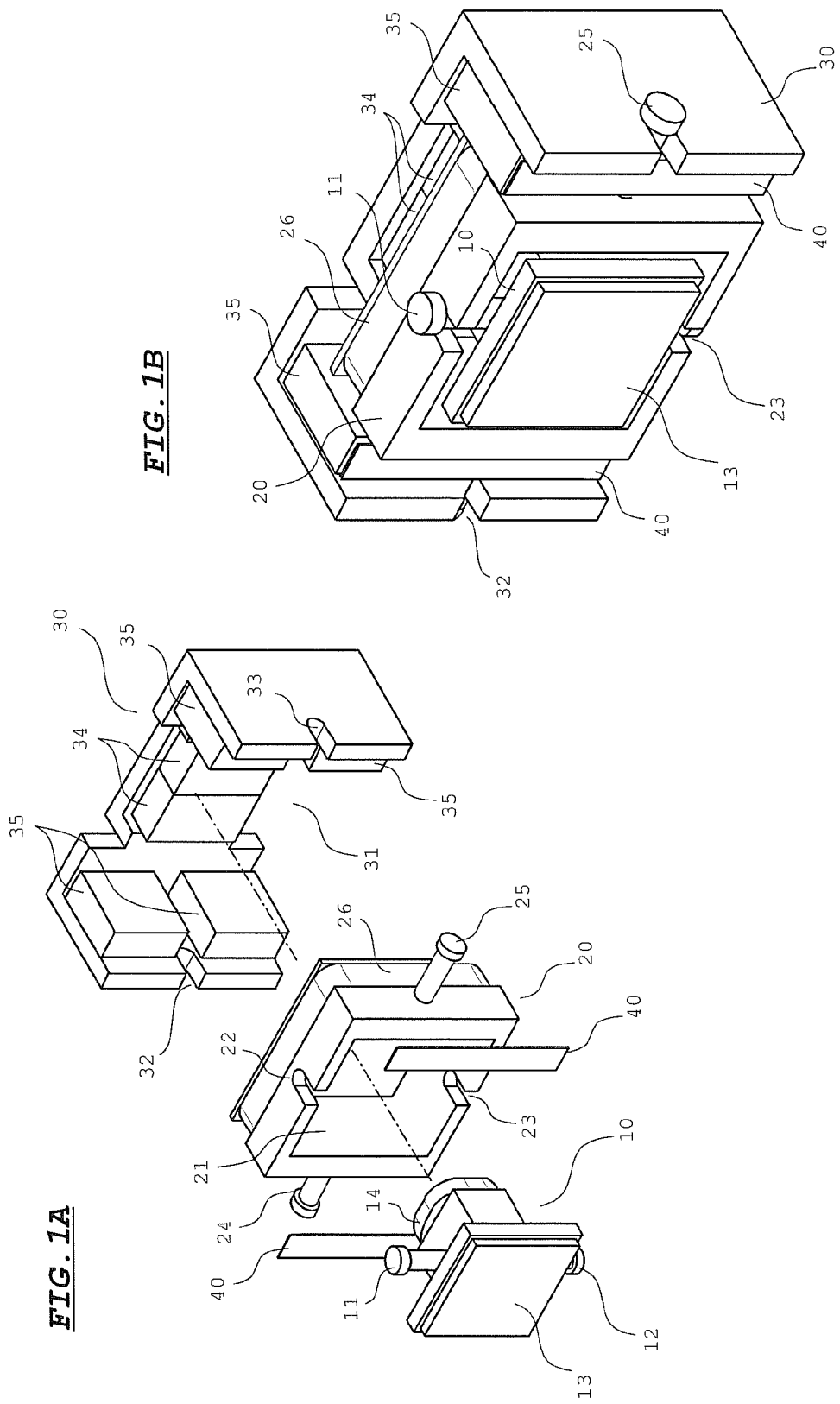
FIGS. 1A and 1B show a configuration of a mirror actuator according to a first embodiment of the invention.

However, it is to be expressly understood that the drawing is for purpose of illustration only and is not intended as a definition of the limits of the invention.

DESCRIPTION OF PREFERRED EMBODIMENTS

Embodiments of the invention will be described below with reference to the accompanying drawings. In the following embodiments, the invention is applied to the laser radar mounted on a passenger automobile. In the following embodiments, the passenger automobile irradiates ahead with the light beam while the scan region is scanned with the light beam, whereby the existence of the obstacle is detected within the scan region and the distance to the obstacle is simultaneously detected.

First Embodiment

A first embodiment relates to a laser radar and a beam irradiation apparatus incorporated into the laser radar. In the laser radar of the first embodiment, the laser beam is incident to a mirror in the horizontal direction, and the target region is scanned in the two-dimensional direction with the light beam by rotating the mirror in the horizontal direction and vertical direction.

FIGS. 1A and 1B show a configuration of a mirror actuator according to a first embodiment of the invention. FIG. 1A is an exploded perspective view of the actuator, and FIG. 1B is a perspective view showing the actuator in an assembled state.

Referring to FIG. 1A, support shafts 11 and 12 having retaining members in end portions thereof are formed in a mirror holder 10. A mirror 13 is attached to a front face of the mirror holder 10, and a coil 14 is attached to a back face of the mirror holder 10. The coil 14 is wound into a rectangular shape.

The mirror holder 10 is supported by a movable frame 20 while being rotatable about the support shafts 11 and 12. An opening 21 is formed in the movable frame 20 in order to accommodate the mirror holder 10, and grooves 22 and 23 are also formed in the movable frame 20 in order to engage the support shafts 11 and 12 of the mirror holder 10. Support shafts 24 and 25 having retaining members in end portions thereof are formed in side faces of the movable frame 20, and a coil 26 is attached to a back face of the movable frame 20. The coil 26 is wound in a rectangular shape.

The movable frame 20 is supported by a fixed frame 30 while being rotatable about the support shaft 24 and 25. A recess 31 is formed in the fixed frame 30 in order to accommodate the movable frame 20, and grooves 32 and 33 are also formed in the fixed frame 30 in order to engage the support shaft 24 and 25 of the movable frame 20. Magnets 34 and 35 are attached to an inner surface of the fixed frame 30. The magnets 34 apply a magnetic field to the coil 14, and the magnets 35 apply a magnetic field to the coil 26. The grooves 32 and 33 are extended from the front face of the fixed frame 30 into a gap between the upper and lower magnets 35.

A pressing plate 40 presses the support shafts 24 and 25 from the front side such that the support shafts 24 and 25 of the movable frame 20 do not drop out from the grooves 32 and 33. A pressing plate (not shown) presses the support shafts 11 and 12 of the mirror holder 10 such that the support shafts 11 and 12 do not drop out from the grooves 22 and 23.

In assembling the actuator, the support shafts 11 and 12 of the mirror holder 10 are engaged in the grooves 22 and 23 of the movable frame 20, and the pressing plate (not shown) is attached to the front face of the movable frame 20 while the front faces of the support shafts 11 and 12 are pressed. Therefore, the mirror holder 10 is rotatably supported by the movable frame 20.

After the mirror holder 10 is attached to the movable frame 20, the support shafts 24 and 25 of the movable frame 20 are engaged in the grooves 32 and 33 of the fixed frame 30, and the pressing plate 40 is attached to the front face of the magnet 35 while the front faces of the support shafts 32 and 33 are pressed. Therefore, the movable frame 20 is rotatably supported by the fixed frame 30, and the assembly of the actuator is completed.

The mirror 13 is rotated, when the mirror holder 10 is rotated about the support shaft 11 and 12 with respect to the movable frame 20. When the movable frame 20 is rotated about the support shafts 24 and 25 with respect to the fixed frame 30, the mirror holder 10 is rotate, and therefore the mirror holder 13 is integrally rotated. Thus, the mirror holder 10 is supported in the two-dimensionally rotatable manner by the support shafts 11 and 12 and the support shafts 24 and 25 which are orthogonal each other, and the rotation of the mirror holder 10 rotates the mirror 13 in the two-dimensional direction.

In the assembled state of FIG. 1B, an arrangement and polarities of the two magnets 34 are adjusted such that a rotational force is generated in the mirror holder 10 about the support shafts 11 and 12 by applying an electric current to the coil 14. Accordingly, when the current is applied to the coil 14, the mirror holder 10 is rotated about the support shaft 11 and 12 by an electromagnetic driving force generated in the coil 14.

In the assembled state of FIG. 1B, an arrangement and polarities of the two magnets 35 are adjusted such that a rotational force is generated in the movable frame 20 about the support shafts 24 and 25 by applying a current to the coil 26. Accordingly, when the current is applied to the coil 26, the movable frame 20 is rotated about the support shaft 24 and 25 by an electromagnetic driving force generated in the coil 26.

Thus, the mirror holder 10 and the movable frame 20 are rotated about the support shafts 11 and 12 and the support shafts 24 and 25 by applying the currents to the coil 14 and the coil 26 respectively. Therefore, the mirror 13 is rotated in the two-dimensional direction while being integral with the mirror holder 10.

Figure 2:
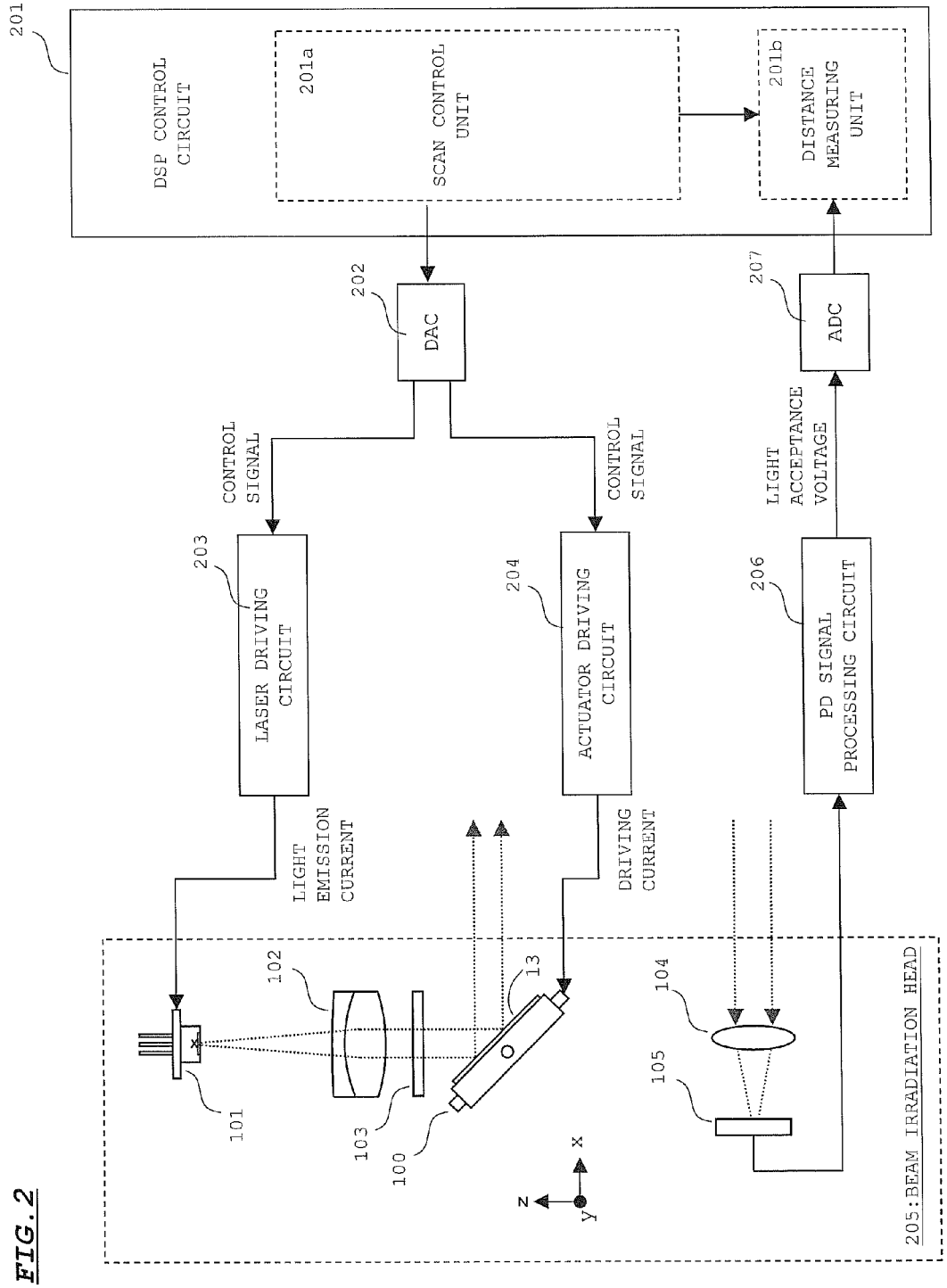
FIG. 2 shows a configuration of a laser radar of the first embodiment.

FIG. 2 shows a configuration of a laser radar of the first embodiment.

As shown in FIG. 2, the laser radar includes a DSP (Digital Signal Processor) control circuit 201, DAC (Digital Analog Converter) 202, a laser driving circuit 203, an actuator driving circuit 204, a beam irradiation head 205, a PD (Photo Detector) signal processing circuit 206 and ADC (Analog Digital Converter) 207.

The DSP control circuit 201 supplies a digital signal to DAC 202 to drive and control the laser driving circuit 203 and the actuator driving circuit 204. The DSP control circuit 201 detects a position of the obstacle included in the scan region and a distance to the obstacle based on the digital signal fed from ADC 207. A scan control unit 201a and a distance measuring unit 201b are provided in the DSP control circuit 201.

The scan control unit 201a produces a control signal to control a mirror actuator 100, and supplies the control signal to the actuator driving circuit 204 through DAC 202. Therefore, the scan region is scanned in the two-dimensional direction with the laser beam. The scan control unit 201a drives the laser driving circuit 203 to control output from a semiconductor laser 101 as described later.

The distance measuring unit 201b measures the distance to the obstacle based on a light acceptance signal fed from ADC 207. A high-frequency internal clock is fed into the distance measuring unit 201b. The distance measuring unit 201b counts the number of clocks N between output timing of a pulsed light beam supplied at each scan position and reflected light acceptance timing, and detects existence of the obstacle at the scan position and a distance L to the obstacle based on the counted number of clocks N. For example, assuming that T is a period of the internal clock, the distance to the obstacle is detected by performing computation of L=C (velocity of light)×T×N/2. In the case where the reflected light beam is not accepted within a predetermined time, it is determined that the obstacle does not exist at the scan position.

DAC 202 converts the digital signal fed from the DSP control circuit 201 into an analog signal (control signal), and supplies the control signal to the laser driving circuit 203 and the actuator driving circuit 204. The laser driving circuit 203 drives the semiconductor laser 101 of the beam irradiation head 205 according to the control signal fed from DAC 202. The actuator driving circuit 204 drives the mirror actuator 100 (see FIGS. 1A and 1B) of the beam irradiation head 205 according to the control signal fed from DAC 202.

The beam irradiation head 205 scans the scan region set in a forward space with a laser beam. As shown in FIG. 2, in addition to the mirror actuator 100, the beam irradiation head 205 includes the semiconductor laser 101, a collimator lens 102, an aberration plate 103, a light acceptance lens 104, and a photodetector 105.

The semiconductor laser 101 emits a laser beam having a predetermined wavelength. The collimator lens 102 converts the laser beam (hereinafter referred to as "scanning laser beam") emitted from the semiconductor laser 101 into a parallel light beam, and the aberration plate 103 performs optical adjustment to the scanning laser beam. Then, the scanning laser beam is incident to the plate-shape mirror 13 supported by the mirror actuator 100.

As described above, the mirror 13 is supported by the mirror actuator 100 while being rotatable about the two axes. The mirror actuator 100 is disposed such that the mirror 13 is rotated in an x-z plane direction (horizontal direction) of FIG. 2 about the support shaft 11 and 12 shown in FIGS. 1A and 1B. When the mirror 13 is located at a neutral position, the scanning laser beam is incident to the mirror 13 from the z-axis direction (horizontal direction) and reflected toward an x-axis direction.

A table (scan table) for irradiating a position in the target region with the scanning laser beam is provided in the DSP control circuit 201. During a scanning operation with the laser beam, in order to control the actuator driving circuit 204, the scan control unit 201a supplies a signal to DAC 202 while referring to the scan table. The scan control performed by referring to the scan table is described later.

The scan control unit 201a supplies a signal to the laser driving circuit 203 through DAC 202 at a time the scanning laser beam scan position reaches a predetermined position (hereinafter referred to as "ranging position") where the obstacle detection and the distance measurement are performed on a scan trajectory. The signal is used to raise the output of the semiconductor laser 101 from a pulse-shape level Pwa to a level Pwb only for a constant time interval.

At this point, the level Pwa is set to a certain extent in which the output of the semiconductor laser 101 can smoothly be raised to the level Pwb according to coming of the ranging position. The level Pwb is set to a certain extent in which the obstacle detection and the distance measurement are smoothly performed.

Figure 3:
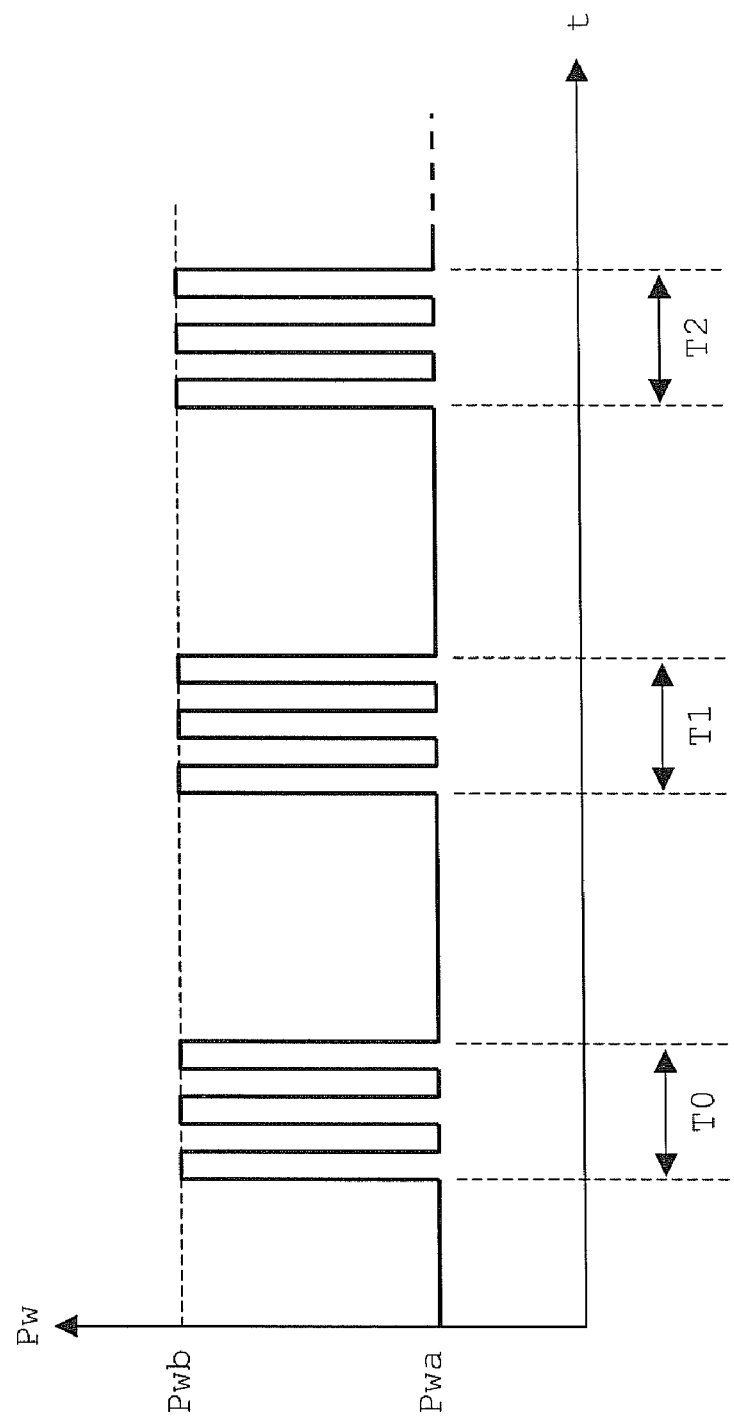
FIG. 3 is a view explaining pulses light emission of a scanning laser beam of the first embodiment.

FIG. 3 shows an adjustment example of outgoing power of the semiconductor laser 101.

As shown in FIG. 3, the output of the semiconductor laser 101 is raised from the pulse-shape level Pwa to the level Pwb in time intervals T0, T1, and T2 corresponding to the ranging position. Therefore, while the target region is scanned with the pulsed-shape scanning laser beam, the scanning laser beam is emitted at the timing of the ranging position.

Returning to FIG. 2, when the obstacle exists at each scan position in the target region, the scanning laser beam emitted with high power is reflected by the obstacle, and the reflected light beam is incident to the photodetector 105 through the light acceptance lens 104. The photodetector 105 supplies an electric signal to the PD signal processing circuit 206 according to a light acceptance amount. The PD signal processing circuit 206 amplifies the electric signal fed from the photodetector 105, performs noise reduction of the electric signal, and supplies the electric signal to ADC 207. ADC 207 converts the fed electric signal into a digital signal and supplies the digital signal to the distance measuring unit 201b.

The distance measuring unit 201b detects reflected light acceptance timing based on the digital signal fed from the ADC 207, and detects the distance to the obstacle at the scan position from the light acceptance timing and the output timing of the high-power pulse laser beam fed from the scan control unit 201a. If the reflected light beam is not accepted within a predetermined time, it is determined that the obstacle does not exist at the scan position.

The scan control of the first embodiment will be described below with reference to FIGS. 4A and 4B.

First, the scan control of a comparative example will be described with reference to FIG. 4A. In the case of FIG. 4A, the mirror 13 is rotated about the support shafts 11 and 12 while a rotation position in the vertical direction of the mirror 13 is fixed. The rotation of the mirror 13 performs the scan in the horizontal direction with the scanning laser beam. When the one-line scan is ended, the mirror 13 is rotated in the vertical direction about the support shafts 24 and 25 by a predetermined angle. Then, the mirror 13 is rotated about the support shafts 11 and 12 to perform the horizontal scan for the next line. The whole of scan region is scanned by repeating the operation.

Figure 4A:
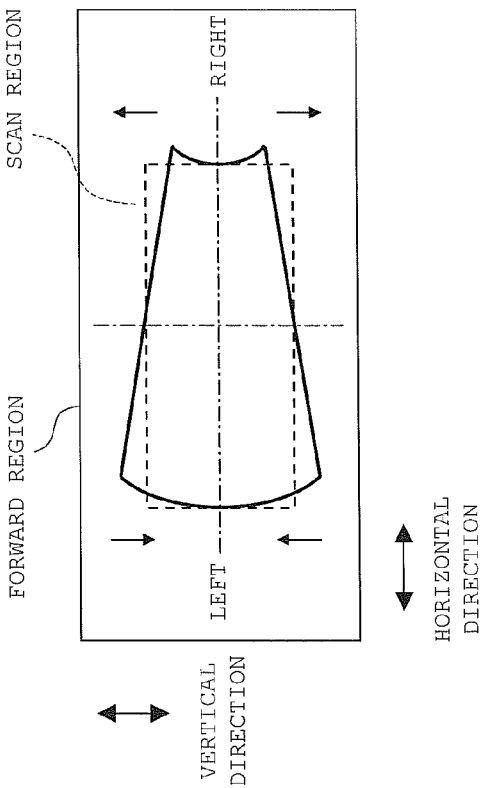
FIGS. 4A and 4B are views explaining a mirror control method of the first embodiment.

In the comparative example, as schematically shown in FIG. 4A, a vertical width is gradually enlarged and contracted from the center toward right and left ends of the scan region. This is because, during the scan in the horizontal direction, the rotation position of the mirror 13 is fixed in the vertical direction. That is, when the rotation position of the mirror 13 is fixed in the vertical direction, an incident angle of the scanning laser beam in the vertical direction is changed with respect to the mirror 13 with the rotation of the mirror 13 about the support shafts 11 and 12. With the rotation of the mirror 13, a swing angle of the scanning laser beam is vertically changed. As a result, each scan line (shown by a broken line in FIG. 4A) on the scan region is inclined with respect to the horizontal direction. At this point, a degree of the inclination of the scan line varies with respect to the horizontal direction depending on the scan line. Therefore, as shown FIG. 4A, in the scan region, right and left sides differ from each other in the width in the vertical direction.

During the scan of the scan line, a degree of swing of the scanning laser beam in the horizontal direction depends on the scan line when the mirror 13 is rotated about the support shafts 11 and 12 without variation. Therefore, a leading end and a terminal end of each scan line are not aligned with each other in the vertical direction. As a result, the scan region becomes a shape in which right and left sides are rounded in the horizontal direction as shown in FIG. 4A.

Figure 4B:
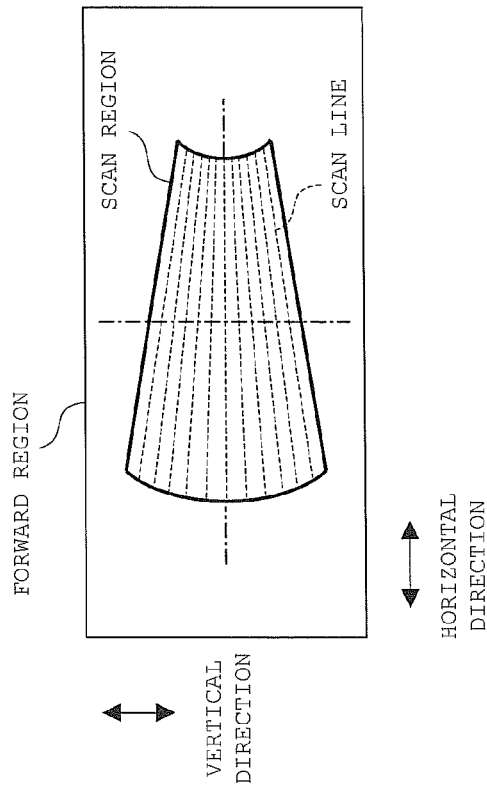

In the first embodiment, as schematically shown by a broken line in FIG. 4B, the mirror 13 is driven and controlled such that the scan region becomes the rectangular shape (horizontally long rectangle). That is, in the first embodiment, during the scan of each line in the horizontal direction, the mirror 13 is rotated not only in the rotation direction (first rotation direction) centering on the support shafts 11 and 12 but also in the rotation direction (second rotation direction) centering on the support shafts 24 and 25.

Specifically, the rotation amount of mirror 13 is decreased in the second rotation direction as the scanning laser beam travels horizontally from the center of the scan region toward the left end, and is increased in the second rotation direction as the scanning laser beam travels horizontally from the center toward the right end. At this point, in each rotation position of the mirror 13 in the first rotation direction, the rotation amount of mirror 13 in the second rotation direction is adjusted such that the incident angle of the scanning laser beam is not vertically changed with respect to the mirror 13. Therefore, because the swing angle of the scanning laser beam is not vertically changed at each rotation position of the mirror 13 in the first rotation direction, the scanning laser beam travels horizontally straight in each scan line. This enables the width of the scan region to be uniform over the region in the vertical direction.

The rotation of the mirror 13 in the first rotation direction is controlled such that the leading end and the terminal end of each line are aligned with each line in the vertical direction. Therefore, right and left sides of the scan region become straight along the vertical direction without roundness in the horizontal direction.

Thus, as shown by the broken line in FIG. 4B, the scan region of the scanning laser beam becomes the rectangular shape by controlling the drive of the mirror 13 in both the first rotation direction and the second rotation direction.

In the scan table, parameter values corresponding to a rotation position of the mirror 13 in the first rotation direction and a rotation position of the mirror 13 in the second rotation direction are sequentially described from a scan start position. The scan control unit 201a refers sequentially to the first and second rotation direction parameter values described in the scan table, and drives and controls the mirror actuator 100 so as to obtain the first and second rotation direction rotation position correlated with each other. Therefore, the rectangular-shape scan region is sequentially scanned along each scan line in the horizontal direction with the scanning laser beam. For example, the currents applied to the coils 14 and 26 are used as the parameter values described in the scan table.

According to the first embodiment, the scan region can be formed into the rectangular shape (horizontally long rectangle) by driving and controlling the mirror 13 both in the first and second rotation directions. Therefore, lack of obstacle detection or lack of distance measurement, caused by the deformation of the scan region from the rectangular shape, can be suppressed to properly perform the obstacle detection and the distance measurement.

Modification of First Embodiment

In the first embodiment, the scan region is scanned in an open-loop manner with the scanning laser beam without monitoring the scan position. On the other hand, in a modification of the first embodiment, the scanning laser beam scan position is fed back to the DSP control circuit 201 and the mirror actuator 100 is servo-controlled such that the scan position follows the desired trajectory.

FIGS. 5A and 5B show a configuration of the mirror actuator 100 according to the modification. A plate-shape mirror 15 is attached to the support shaft 12 such that the reflecting surface of the plate-shape mirror 15 is parallel to the reflecting surface of the mirror 13. Other configurations are similar to those of FIG. 1.

In the configuration of FIGS. 5A and 5B, the mirror 15 is rotated while being integral with the mirror 13. The mirror 15 is rotated when the mirror 13 is rotated about the support shafts 11 and 12, and the mirror 15 is rotated when the mirror 13 is rotated about the support shafts 24 and 25 along with the mirror holder 10.

Figure 6:
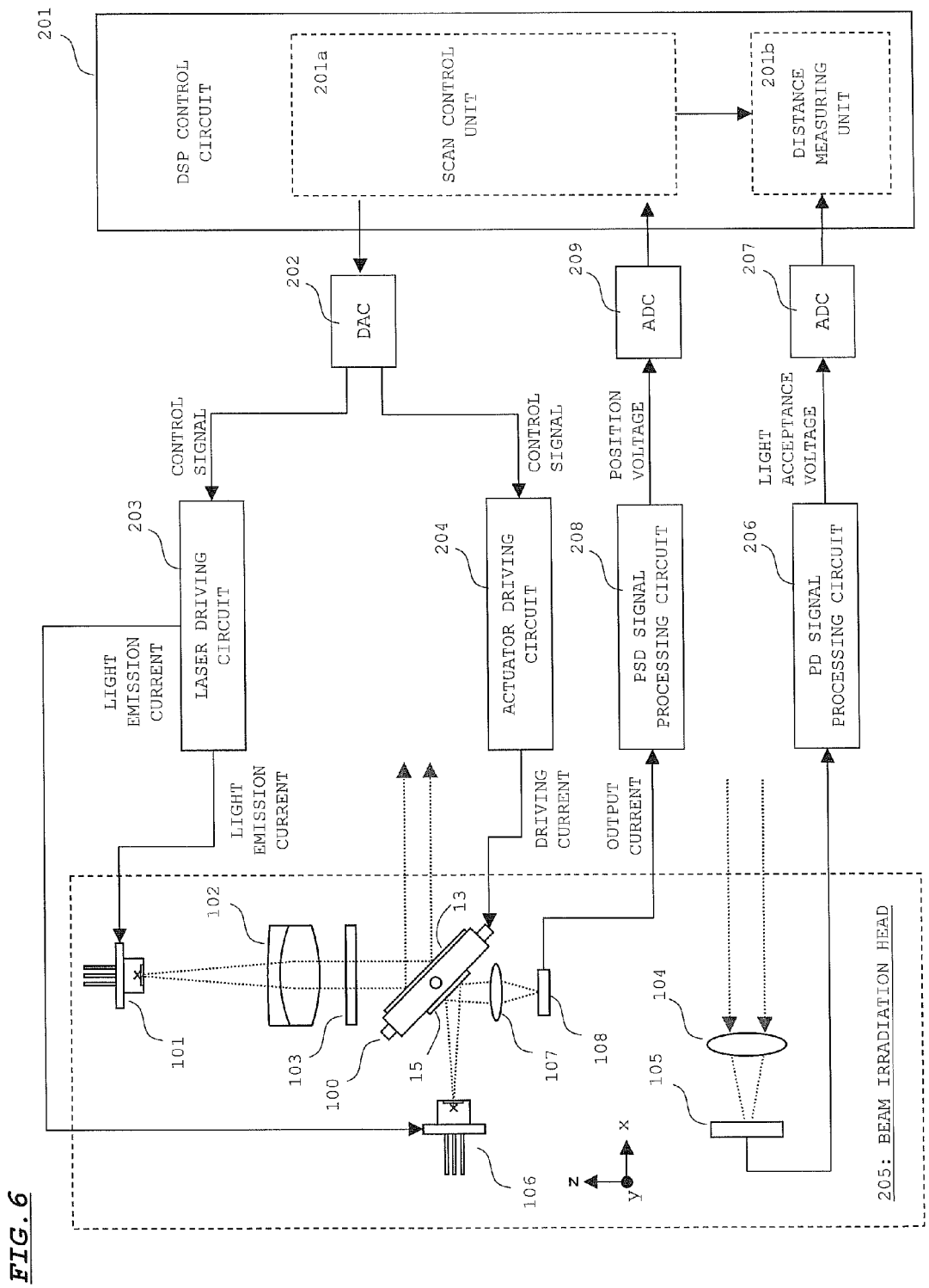
FIG. 6 shows a configuration of a laser radar of the modification of the first embodiment.

FIG. 6 shows a configuration of the laser radar of the modification. Referring to FIG. 6, a semiconductor laser 106 which emits a laser beam (hereinafter referred to as "servo laser beam") having a specific wavelength, a collective lens 107, and a PSD (Position Sensitive Detector) 108 are provided in the beam irradiation head 205. Furthermore, a PSD signal processing circuit 208 and ADC 209 which perform processing of a signal from PSD 108 are added to the circuit configuration.

The semiconductor laser 106 is disposed such that a servo laser beam is incident to the mirror 15 from the x-axis direction when the mirror 13 is located at a neutral position. The servo laser beam reflected by the mirror 15 is collected onto the light acceptance surface of PSD 108 through the collective lens 107. As described above, because the mirror 15 is rotated along with the mirror 13, the servo laser beam acceptance position on the light acceptance surface of PSD 108 corresponds to the scanning laser beam scan position in the scan region one by one. Therefore, the scanning laser beam scan position can be detected based on the signal from PSD 108.

PSD 108 supplies a current according to the servo laser beam convergent position on the light acceptance surface. The current supplied from the PSD 108 is fed into the PSD signal processing circuit 208. The PSD signal processing circuit 208 produces a voltage signal indicating the servo laser beam convergent position from the supplied current, and supplies the voltage signal to ADC 209. ADC 209 converts the supplied voltage signal into a digital signal and supplies the digital signal to the scan control unit 201a of the DSP control circuit 201.

During the scan operation, the scan control unit 201a detects the servo laser beam convergent position on the light acceptance surface based on the signal fed from ADC 209. The scan control unit 201a supplies the control signal to the actuator driving circuit 204 through DAC 202 such that the detection position of the servo laser beam is drawn into the desired trajectory. Therefore, the scan region is scanned along the desired trajectory with the scanning laser beam.

Figures 7A, 7B:
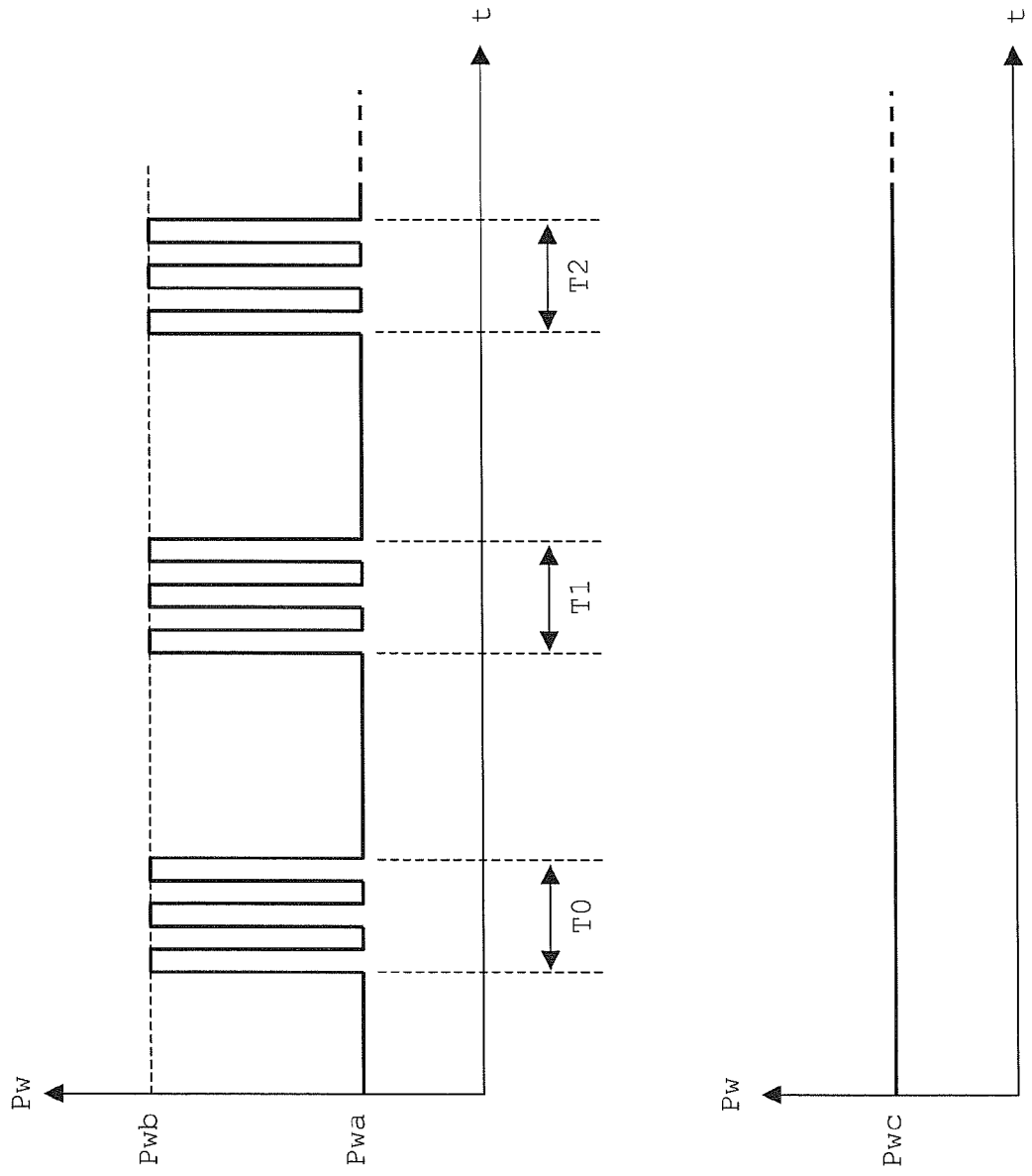
FIGS. 7A and 7B are views explaining laser beam power control of the modification of the first embodiment.

During the scan operation with the scanning laser beam, the scan control unit 201a supplies a signal to the laser driving circuit 203 through the DAC 202 in order that the semiconductor laser 106 always emits a light beam with a power level Pwc. FIG. 7A shows a power level of the semiconductor laser 101, and FIG. 7B shows a power level of the semiconductor laser 106.

Figure 8B:
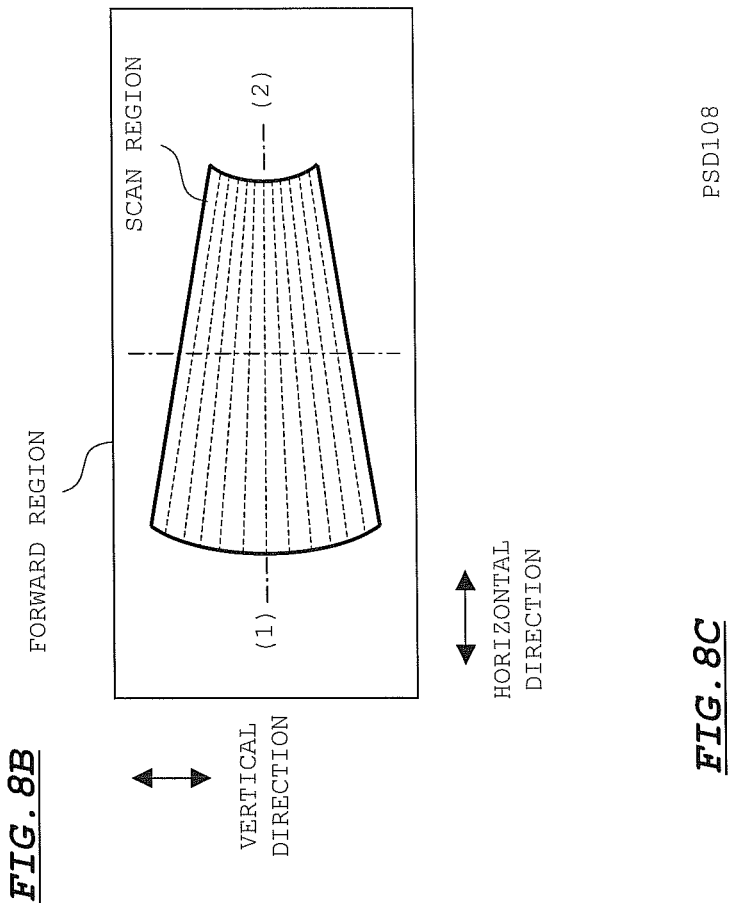
FIGS. 8A to 8C are views explaining a mirror control method of the modification of the first embodiment.
Figure 8C:
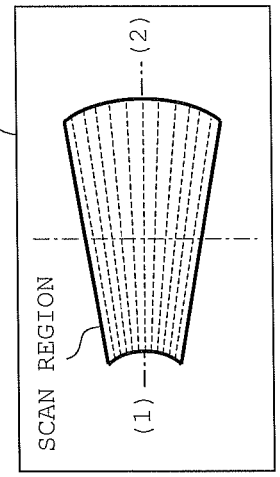
Figure 8A:
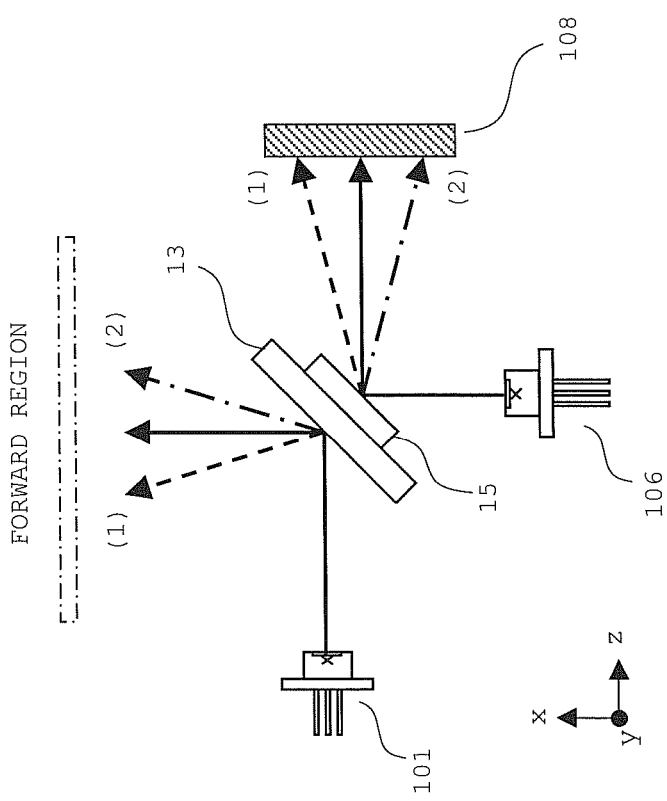

FIGS. 8B and 8C schematically shows scan regions of the scanning laser beam and servo laser beam when the mirror 13 is rotated about the support shafts 11 and 12 to scan the scan region with the scanning laser beam while the rotation position centering on the support shafts 24 and 25 is fixed in the modification. As shown in FIG. 8A, the scanning laser beam and the servo laser beam are incident to the mirror 13 and the mirror 15 such that laser optical axes of the scanning laser beam and the servo laser beam become perpendicular to each other. That is, the directions in which the scanning laser beam and the servo laser beam are incident to the mirror 13 and the mirror 15 are similar to those of FIG. 6. In FIG. 8A, the collimator lens 102, the aberration plate 103, and the collective lens 107 are neglected for the sake of convenience.

Similarly to the case of FIG. 4A, in the scanning laser beam scan region, the vertical width is gradually enlarged and contracted from the center toward the right and left ends of the scan region as shown in FIG. 8B. Similarly to the scanning laser beam scan region, in the servo laser beam scan region on the light acceptance surface of PSD 108, the width is gradually enlarged and contracted from the center toward the right and left ends as shown in FIG. 8C. As can be seen from comparison of FIGS. 8B and 8C, the direction in which the scan region is enlarged and the direction in which the scan region is contracted are reversed in the scanning laser beam and the servo laser beam.

Figure 9C:
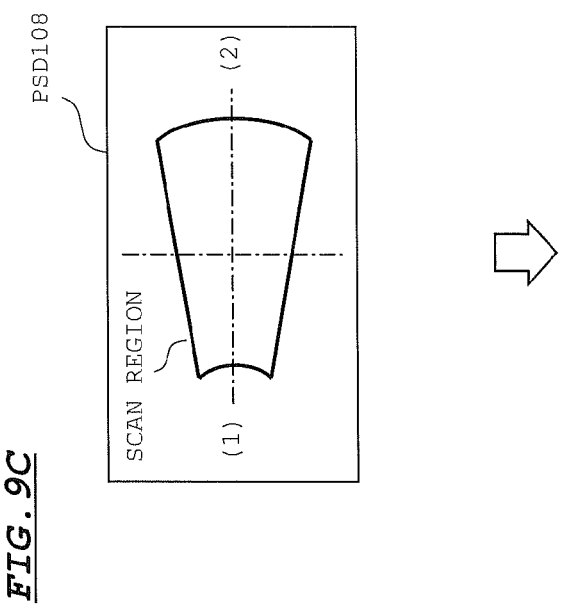
FIGS. 9A to 9D are views explaining the mirror control method of the modification of the first embodiment.
Figure 9D:
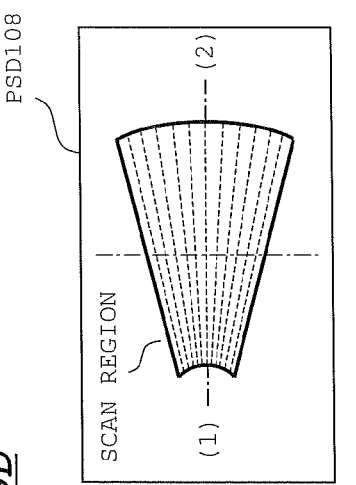
Figure 9A:
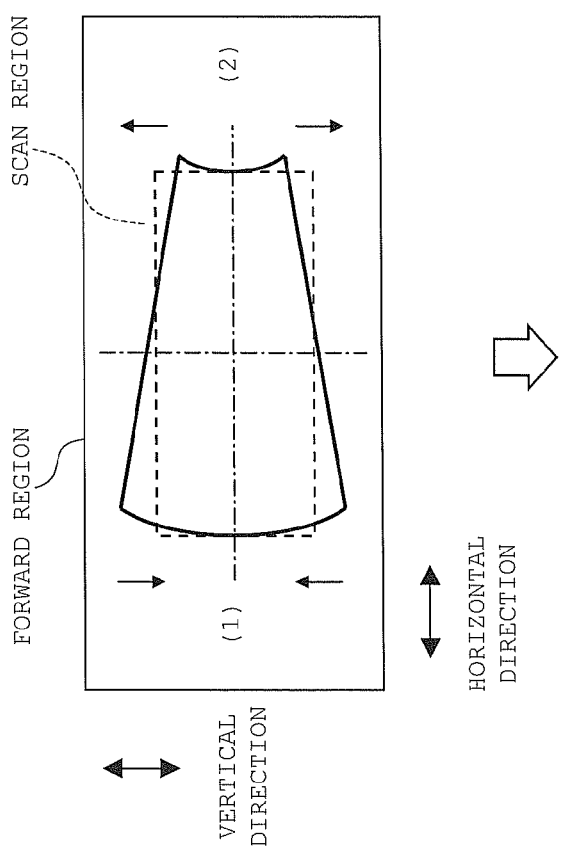
Figure 9B:
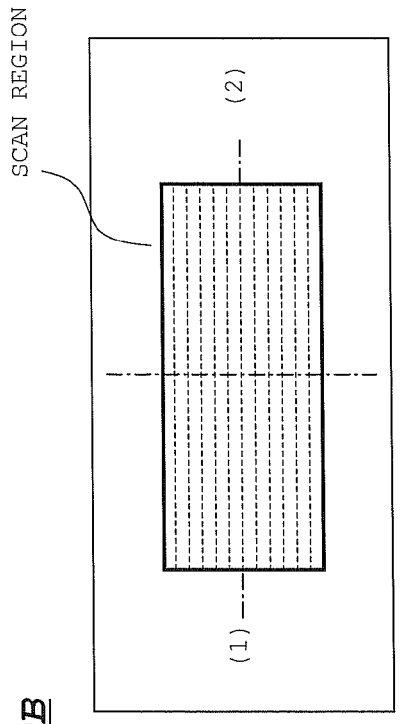

In the modification, similarly to the case of FIG. 4A, the mirror 13 is driven and controlled such that the scanning laser beam scan region becomes the rectangular shape (horizontally long rectangle) as schematically shown in FIG. 9A. That is, during scanning each line in the horizontal direction, the mirror 13 is rotated not only in the first rotation direction centering on the support shafts 11 and 12 but also the second rotation direction centering on the support shafts 24 and 25. Therefore, as shown in FIG. 9B, the scanning laser beam scan region becomes the rectangular shape (horizontally long rectangle). In FIG. 9B, because the mirror 15 is rotated while being integral with the mirror 13, the servo laser beam scan region on the light acceptance surface of PSD 108 is also changed from the state shown in FIG. 8C.

FIG. 9D schematically shows the servo laser beam scan region on the light acceptance surface of PSD 108 when the scanning laser beam scan region is corrected into the rectangular shape as shown in FIG. 9B. In FIG. 9D, the servo laser beam scan region is changed from the state of FIG. 9C to the state of FIG. 9D by correcting the scanning laser beam scan region into the rectangular shape. That is, when the scanning laser beam scan region is corrected into the rectangular shape, a difference in width at right and left ends becomes enlarged than before in the servo laser beam scan region.

In the modification, the mirror actuator 100 is servo-controlled as follows based on the scan region of FIG. 9D.

The scan control unit 201a previously retains a servo laser beam trajectory (reference trajectory) on the PSD light acceptance surface when the scan region becomes the state of FIG. 9D. FIG. 9D schematically shows the reference trajectory with the broken line. During the scan operation, the scan control unit 201a compares the reference trajectory and the servo laser beam convergent position on the PSD light acceptance surface, which is detected based on the signal fed from ADC 209, and adjusts the control signal for the mirror actuator 100 such that the detected detection position is drawn into the reference trajectory. The scan control unit 201a supplies the control signal to the actuator driving circuit 204 through DAC 202 after the adjustment. Thus, the mirror actuator 100 is servo-controlled, which allows the rectangular region of FIG. 9B to be scanned with the scanning laser beam.

According to the modification, similarly to the first embodiment described with reference to FIGS. 1 to 4, the scan region is formed into the rectangular shape (horizontally long rectangle), so that the lack of obstacle detection or the lack of distance measurement, caused by the deformation of the scan region from the rectangular shape, can be suppressed.

According to the modification, because the scanning laser beam scan position is servo-controlled, even if the scanning laser beam scan position is shifted due to disturbance, the scanning laser beam scan position can be turned to the desired trajectory. Therefore, compared with the first embodiment, the scan position can more smoothly follows the desired trajectory, and the obstacle detection and the distance measurement can be performed more properly.

Second Embodiment

In a laser radar according to a second embodiment of the invention, as shown in FIG. 10, the scanning laser beam is incident to the mirror 13 from the vertical direction, and the mirror 13 is rotated in the horizontal direction and perpendicular direction to two-dimensionally scan the target region with the laser beam. The configuration of the mirror actuator 100 of the second embodiment is similar to that of FIG. 1.

The configuration of the laser radar of the second embodiment is basically similar to that of FIG. 2. However, because the scanning laser beam incident direction is changed to the vertical direction, the drive and control of the mirror 13 is changed compared with the first embodiment.

Figure 11A:
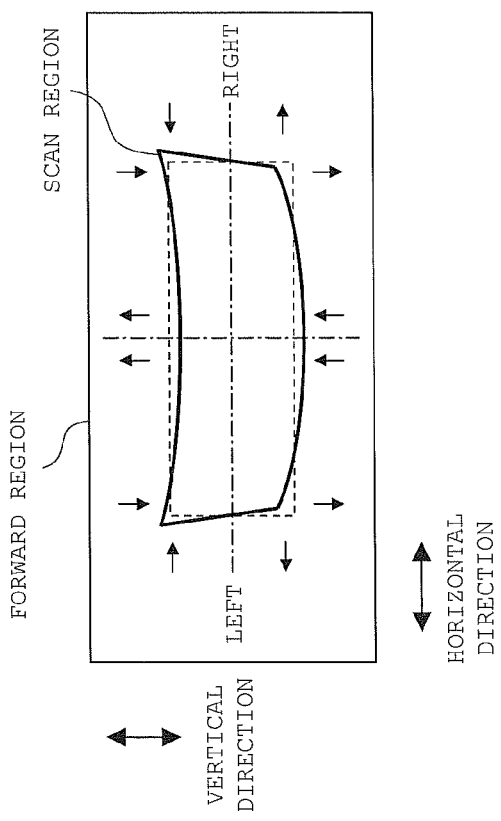
FIGS. 11A and 11B are views explaining a mirror actuator control method of the second embodiment.

FIG. 11A schematically shows the scanning laser beam scan region when the mirror 13 is rotated about the support shafts 11 and 12 to scan the scan region with the scanning laser beam while the rotation position centering on the support shafts 24 and 25 is fixed.

As shown in FIG. 11A, the scanning laser beam scan region becomes a shape in which right and left ends are vertically shifted with respect to the center. Similarly to the case of FIG. 4A, this is attributed to the following facts. That is, the incident angle in the vertical direction of the scanning laser beam is changed with respect to the mirror 13 as the mirror 13 is rotated about the support shafts 11 and 12, and the swing angle of the scanning laser beam in the horizontal direction depends on the scan line.

Figure 11B:
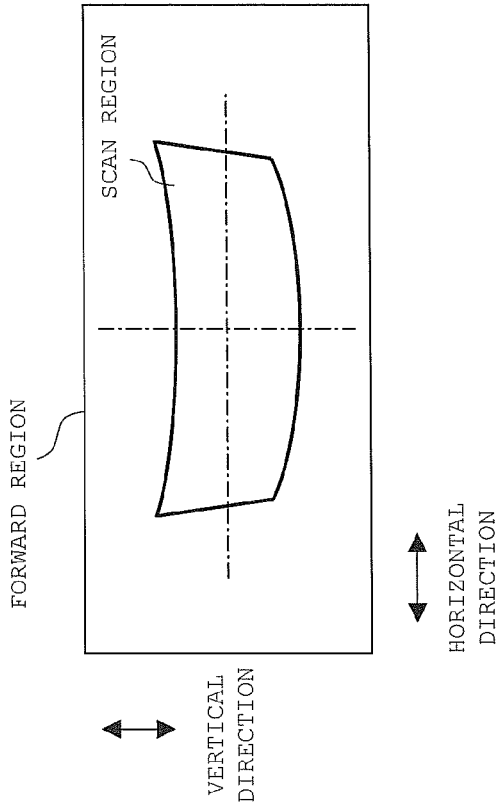

In the second embodiment, similarly to the first embodiment, the mirror 13 is driven and controlled such that the scan region becomes the rectangular shape (horizontally long rectangle) as schematically shown by the broken line of FIG. 11B. That is, during the scan of each line in the horizontal direction, the mirror 13 is rotated not only in the first rotation direction centering on the support shafts 11 and 12 but also in the second rotation direction centering on the support shafts 24 and 25.

Specifically, the rotation amount of mirror 13 is decreased in the first rotation direction as the scanning laser beam travels vertically toward the upper side of the scan region, and the rotation amount of mirror 13 is increased in the first rotation direction as the scanning laser beam travels vertically toward the lower side. In the second rotation direction, the scanning laser beam swing direction in the central portion of the scan region is vertically shifted upward, and the scanning laser beam swing direction is vertically shifted downward as the scanning laser beam travels toward the right and left ends. At this point, the rotation amounts of mirror 13 in the first and second rotation directions are adjusted such that the scanning laser beam travels horizontally straight in the rectangular scan region.

According to the second embodiment, similarly to the first embodiment, the scan region can be formed into the rectangular shape (horizontally long rectangle) by driving and controlling the mirror 13 in the above-described manner. Therefore, the lack of obstacle detection or the lack of distance measurement, caused by the deformation of the scan region from the rectangular shape, can be suppressed to properly perform the obstacle detection and the distance measurement.

Modification of Second Embodiment

In the second embodiment, similarly to the modification of the first embodiment, the scanning laser beam scan position is detected using the servo laser beam, and the scan performed with the servo laser beam can be servo-controlled based on the detection result of the scanning laser beam scan position.

Figure 12B:
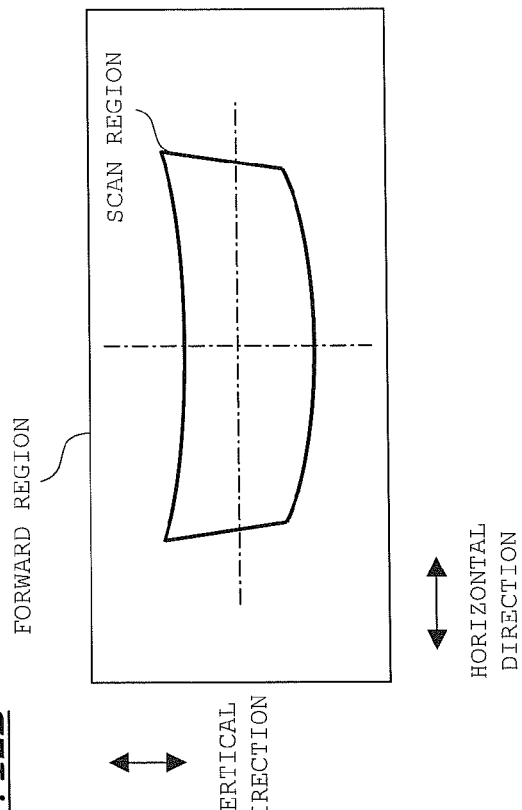
FIGS. 12A to 12C are views explaining a mirror actuator control method according to a modification of the second embodiment.
Figure 12C:
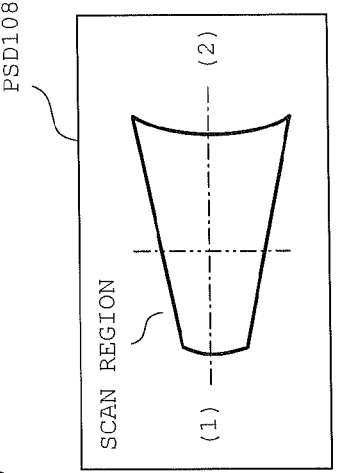
Figure 12A:
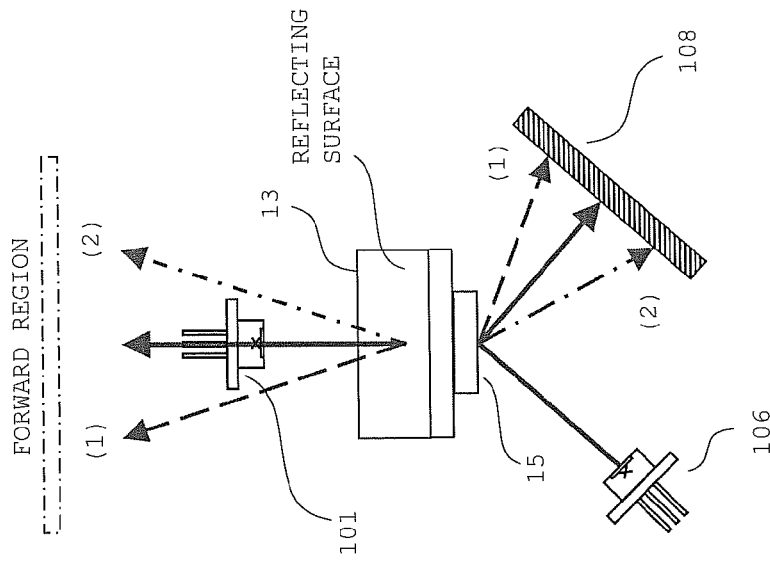

FIGS. 12B and 12C schematically shows the scanning laser beam scan region in the target region and the servo laser beam scan region on the light acceptance surface of PSD 108 when the mirror 13 is rotated about the support shafts 11 and 12 to scan the scan region with the scanning laser beam while the rotation position centering on the support shafts 24 and 25 is fixed. As shown in FIG. 12A, similarly to the case of FIG. 8A, the servo laser beam is incident to the mirror 15 from the horizontal direction. As shown in FIG. 10, the scanning laser beam is incident to the mirror 13 from the vertical direction.

As described above, the scanning laser beam scan region becomes the shape of FIG. 12B. On the other hand, the servo laser beam scan region on the light acceptance surface of PSD 108 becomes the shape of FIG. 12C.

Figure 13B:
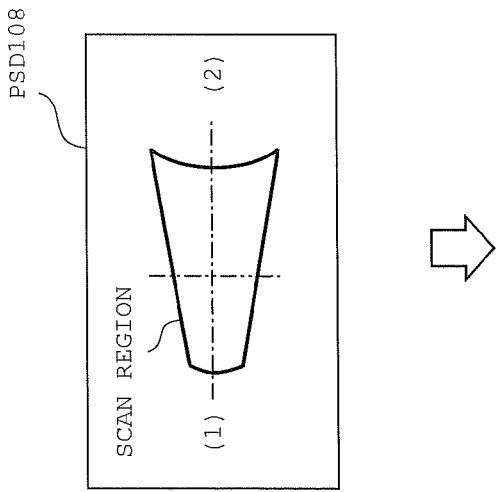
FIGS. 13A to 13C are views explaining the mirror actuator control method of the modification of the second embodiment.
Figure 13C:
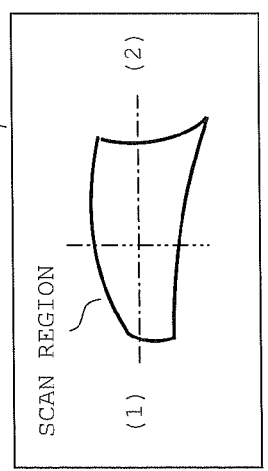
Figure 13A:
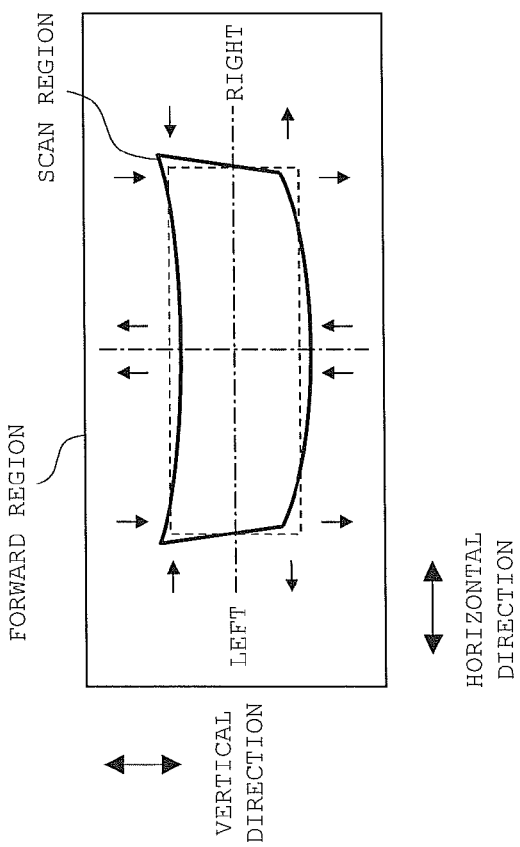

In the modification of the second embodiment, the mirror 13 is driven and controlled such that the scan region becomes the rectangular shape (horizontally long rectangle) as schematically shown by the broken line of FIG. 13A. The servo laser beam scan region on the light acceptance surface of PSD 108 is changed from the state of FIG. 13B to the state of FIG. 13C. That is, when the scanning laser beam scan region is corrected into the rectangular shape, the servo laser beam scan region becomes an irregularly-deformed shape than before correcting. Accordingly, in the modification, the mirror actuator 100 is servo-controlled based on the scan region of FIG. 13C.

The servo-control method of the modification of the second embodiment is similarly performed based on the scan region of FIG. 9D. That is, the scan control unit 201a adjusts the control signal for the mirror actuator 100 such that the servo laser beam convergent position is drawn into the previously-retained reference trajectory (the servo laser beam trajectory when the scan region is in the state of FIG. 13C). Then, the scan control unit 201a supplies the adjusted control signal to the actuator driving circuit 204 through DAC 202. Therefore, the rectangular region shown by the broken line in FIG. 13A is scanned with the scanning laser beam.

According to the modification of the second embodiment, similarly to the modification of the first embodiment described with reference to FIGS. 5 to 9, because the scanning laser beam scan position is servo-controlled, even if the scanning laser beam scan position is shifted due to disturbance, the scanning laser beam scan position can be turned to the desired trajectory. Therefore, compared with the first embodiment described with reference to FIGS. 10 and 11, the scan position can more smoothly follows the desired trajectory, and the obstacle detection and the distance measurement can be performed more properly.

Third Embodiment

As described with reference to FIG. 8A, when the mirror 13 is rotated about the support shaft 11 and 12 while the rotation position in the vertical direction is fixed, because the swing angle of the scanning laser beam is vertically changed, the scanning laser beam scan trajectory in the scan region does not become horizontal, but the scanning laser beam scan trajectory is inclined with respect to the horizontal direction. Therefore, the scan region becomes the deformed shape as shown in FIG. 8B. A pitch between the scan trajectories becomes coarse as the scanning laser beam travels toward the left end of FIG. 8B, and becomes fine as the scanning laser beam travels toward the right end. Therefore, obstacle detection accuracy is lowered as the scanning laser beam travels toward the left end.

When the mirror 13 is rotated about the support shafts 11 and 12 without variation during the scan of each scan line, because the degree of swing of the scanning laser beam in the horizontal direction depends on the scan line, the leading end and terminal end of each scan line are not aligned with each other in the vertical direction. Therefore, the scan region becomes the shape in which right and left sides are rounded in the horizontal direction as shown in FIG. 8B.

On the other hand, when the mirror 13 is driven and controlled, the servo laser beam scan region on the light acceptance surface of PSD 108 becomes the shape in which the width is gradually contracted and enlarged from the center toward the right and left ends as shown in FIG. 8C. In FIG. 8C, the broken line indicates the servo laser beam scan trajectory. Similarly to the scanning laser beam, the pitch between the servo laser beam scan trajectories becomes coarse toward the right end of FIG. 8C, and becomes fine toward the left end.

In the first embodiment, the mirror 13 is driven and controlled such that the scan region becomes the rectangular shape (horizontally long rectangle). That is, in the first embodiment, during the scan of each line in the horizontal direction, the mirror 13 is rotated not only in the rotation direction (first rotation direction) centering on the support shafts 11 and 12 but also in the rotation direction (second rotation direction) centering on the support shafts 24 and 25.

In the first embodiment, as described above, the scanning laser beam scan region becomes the rectangular shape by driving and controlling the mirror 13 in the above-described manner. The scanning laser beam scan trajectory in the scan region becomes horizontal in any scan line, and the pitch between the scan lines is kept constant. Therefore, the obstacle can be smoothly detected with high accuracy at any point in the scan region.

At the same time, in the first embodiment, when the mirror 13 is driven and controlled, the servo laser beam scan region is changed from the state of FIG. 9C to the state of FIG. 9D. That is, when the scanning laser beam scan region is corrected into the rectangular shape, the difference in width between the right and left ends is increased in the servo laser beam scan region.

In the first embodiment, in the pitch between the servo laser beam scan lines on the PSD light acceptance surface, the right side becomes coarse and the left side becomes fine compared with the case of FIG. 8C. Therefore, resolution of the PSD light acceptance surface for the servo laser beam acceptance position is lowered toward the left end, and possibly an error is generated in a positional relationship between the servo laser beam acceptance position and the scanning laser beam scan position in the region near the left end.

Figure 14B:
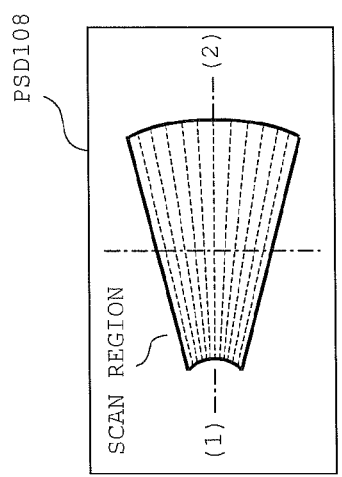
FIGS. 14A to 14C are views explaining a PSD disposing method according to a third embodiment of the invention.
Figure 14C:
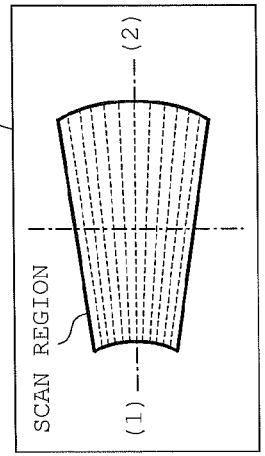
Figure 14A:
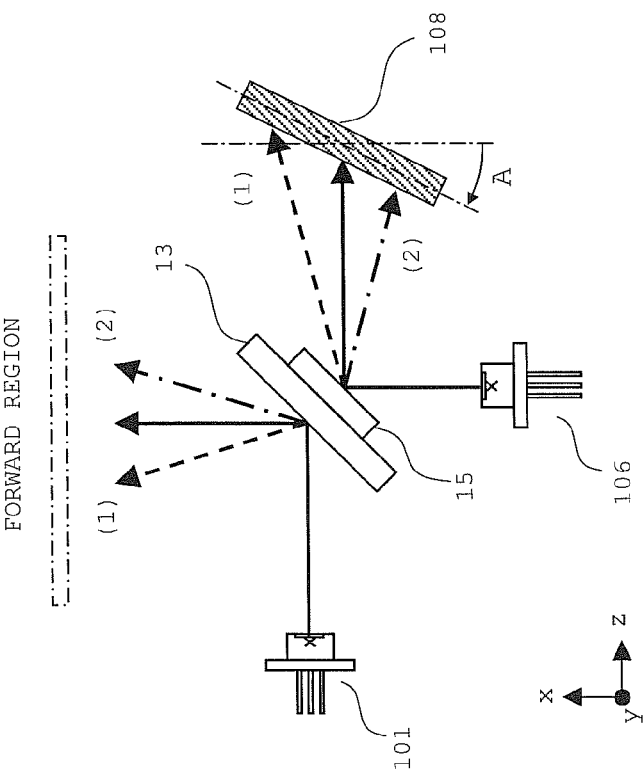

In a third embodiment of the invention, as shown in FIG. 14A, PSD 108 is disposed while inclined toward a direction of an arrow A in order to avoid the disadvantage. The configuration of the laser radar of the third embodiment is identical to that of FIG. 6 except that PSD 108 is inclined. The configuration of the mirror actuator 100 of the third embodiment is identical to that of FIGS. 5A and 5B. In FIG. 14A, the collimator lens 102, the aberration plate 103, and the collective lens 107 are omitted for the sake of convenience.

The servo laser beam scan region on the PSD light acceptance surface is changed from the state of FIG. 14B to the state of FIG. 14C by inclining PSD 108. That is, the difference in width between the right and left ends of the scan region can be decreased by inclining PSD 108. Accordingly, the pitch between the servo laser beam scan lines can be expanded at the left end of the scan region, and the resolution of the PSD light acceptance surface can be improved for the servo laser beam acceptance position. As a result, the servo laser beam acceptance position can be properly detected.

Accordingly, the mirror actuator 100 is servo-controlled such that the servo laser beam acceptance position follows the desired trajectory, which allows the scanning laser beam to smoothly follow the desired trajectory.

According to the third embodiment, the scan region can be formed into the rectangular shape (horizontally long rectangle) by driving and controlling the mirror 13 in the above-described manner. Therefore, the lack of obstacle detection or the lack of distance measurement, caused by the deformation of the scan region from the rectangular shape, can be suppressed to properly perform the obstacle detection and the distance measurement.

Additionally, the servo laser beam acceptance position can be properly detected by inclining PSD 108 in the above-described manner. Therefore, because the scanning laser beam scan position is servo-controlled based on the signal supplied from PSD 108, even if the scanning laser beam scan position is shifted due to disturbance, the scanning laser beam scan position can be smoothly turned to the desired trajectory. Accordingly, the scanning laser beam scan position can smoothly follow the desired trajectory to properly perform the obstacle detection and the distance measurement.

The deformation of the servo laser beam scan region on the PSD light acceptance surface can be suppressed with the inclination of PSD 108. At the same time, it is necessary to ensure a large space to incline PSD 108. Because a servo laser beam defocused state on the PSD light acceptance surface proceeds with the inclination of PSD 108, it is supposed that the signal detected by PSD 108 is deteriorated. Accordingly, it is necessary to appropriately set a degree of inclination of PSD 108 in consideration of the trouble with the space and the trouble with the detection signal.

When PSD 108 is inclined, the servo laser beam reflected by the PSD 108 is reflected by the mirror 15, and the reflected light beam (hereinafter referred to as "stray light") can be avoided to be incident to PSD 108 again as follows.

Figure 15C:
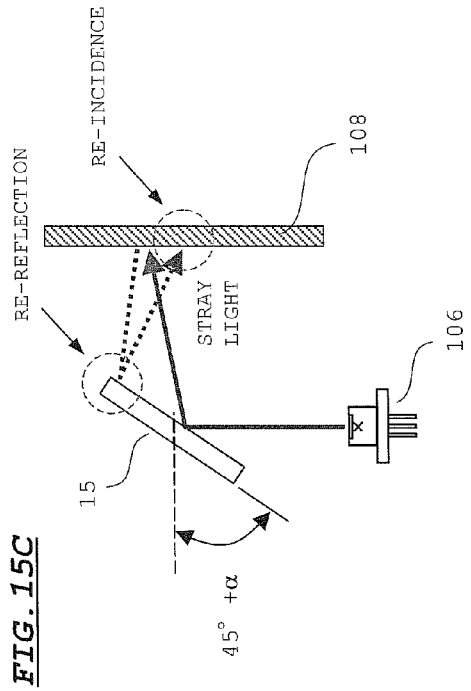
FIGS. 15A to 15C are views explaining an effect of the PSD disposing method of the third embodiment.
Figure 15A:
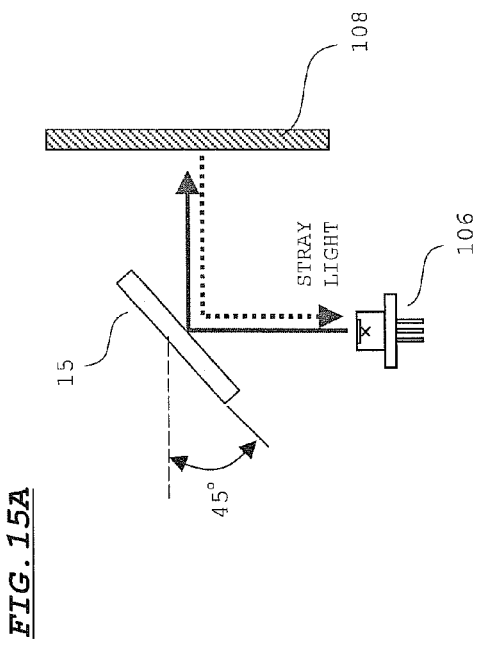
Figure 15B:
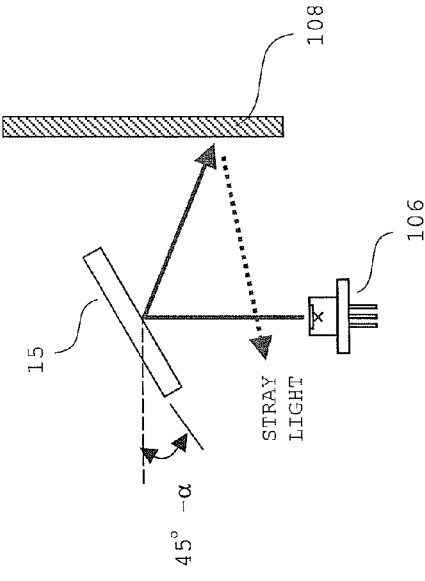

FIGS. 15A to 15C show a stray light optical path when PSD 108 is disposed while not inclined. In FIGS. 15A to 15C, the stray light optical path is indicated by a dotted-line arrow.

FIG. 15A shows a state in which the mirror 15 is located at a neutral position in a horizontal rotation direction. In this case, the stray light reversely travels in a servo laser beam optical path. When the mirror 15 is rotated clockwise by α degrees from the neutral position, the stray light optical path is changed as shown in FIG. 15B. In FIG. 15B, because the stray light is not reflected by the mirror 15, the stray light is not incident to PSD 108 again. On the other hand, when the mirror 15 is rotated counterclockwise by α degrees from the neutral position, the stray light optical path is changed as shown in FIG. 15C. In FIG. 15C, because the stray light is reflected by the mirror 15 again, the stray light is incident to PSD 108 again.

Thus, when the stray light is incident to PSD 108 again, the output current of PSD 108 is superimposed with the a current component generated by the stray light, an error is generated in a relationship between the servo light beam acceptance position on the PSD light acceptance surface and the scanning laser beam scan position, which possibly results in a trouble with the scanning laser beam servo control.

On the other hand, in the third embodiment, the re-incidence of the stray light to PSD 108 can be avoided by inclining PSD 108.

Figure 16C:
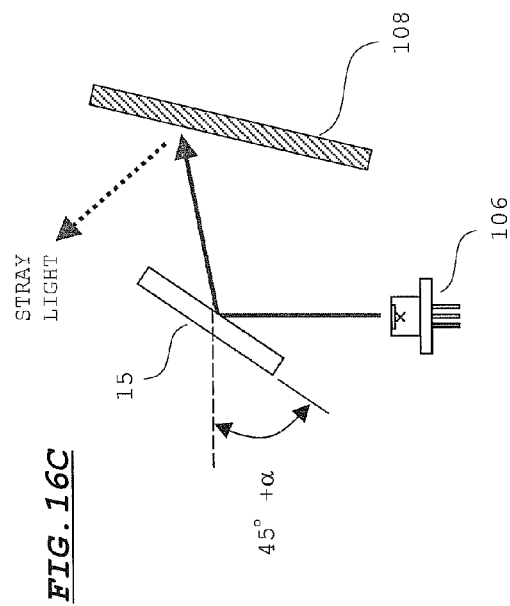
FIGS. 16A to 16C are views explaining the effect of the PSD disposing method of the third embodiment.
Figure 16A:
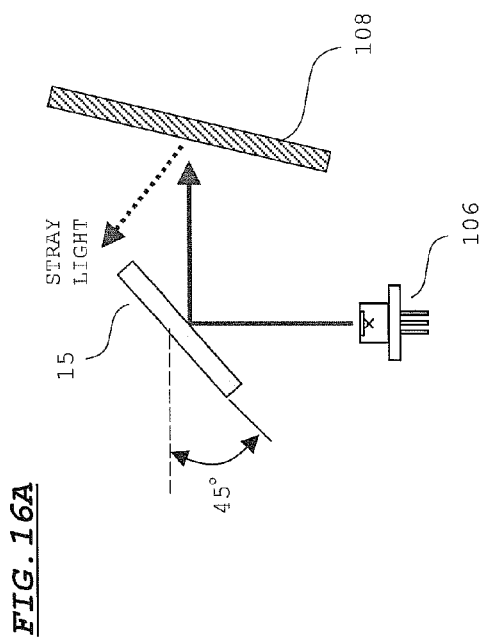
Figure 16B:
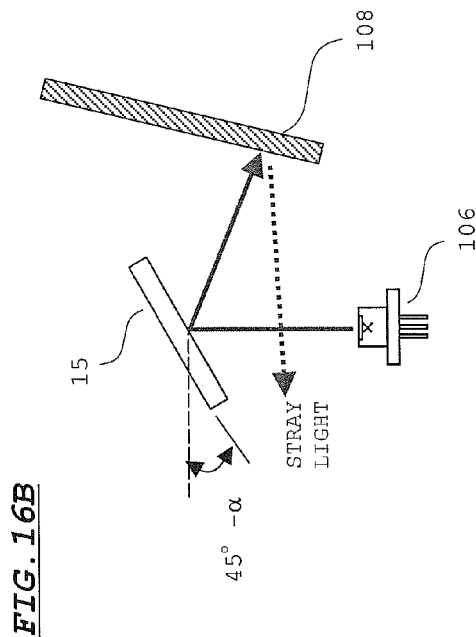

FIGS. 16A to 16C shows the stray light optical path when PSD 108 is disposed while inclined. In FIGS. 16A to 16C, the stray light optical path is indicated by a dotted-line arrow. FIG. 16A shows a state in which the mirror 15 is located at the neutral position in the horizontal rotation direction, and FIGS. 16B and 16C show states in which the mirror 15 is rotated clockwise and counterclockwise by α degrees from the neutral position respectively.

When PSD 108 is disposed while inclined, the case in which the stray light is reflected by the mirror 15 and incident to PSD 108 again is not generated as shown in FIGS. 16A to 16C. When the rotation position of the mirror 15 is located at a predetermined position between the cases shown in FIGS. 16A and 16B, the stray light is reflected by the mirror 15 again. However, in this case, because the stray light is reflected toward the lower end direction of PSD 108, the re-incidence of the stray light reflected by the mirror 15 to the PSD light acceptance surface can be avoided by appropriately adjusting the inclination angle of PSD 108, a size of the light acceptance surface of PSD 108, and a size of the reflecting surface of the mirror 15. In order to avoid the re-incidence of the stray light to the PSD light acceptance surface, preferably the reflecting surface of the mirror 15 and the light acceptance surface of PSD 108 are formed as small as possible.

According to the third embodiment, the re-incidence of the stray light to the light acceptance surface of PSD 108 can be avoided by inclining PSD 108. Therefore, a malfunction of PSD 108 due to the stray light can be suppressed to smoothly and properly servo-control the scanning laser beam.

Fourth Embodiment

In the third embodiment, the difference in width between the right and left ends of the servo laser beam scan region on the PSD light acceptance surface is suppressed by inclining PSD 108. Therefore, the pitch between the servo laser beam scan lines is expanded at the left end of the scan region, so that the resolution of the PSD light acceptance surface can be improved for the servo laser beam acceptance position.

In a fourth embodiment of the invention, the difference in width between the right and left ends of the servo laser beam scan regions on the PSD light acceptance surface is suppressed by adjusting the arrangement of the semiconductor lasers 101 and 106. That is, in the fourth embodiment, the servo laser beam optical system is configured such that the optical axes of the scanning laser beam and servo laser beam become parallel to each other when the scanning laser beam and servo laser beam are emitted from the semiconductor lasers 101 and 106.

Figure 17B:
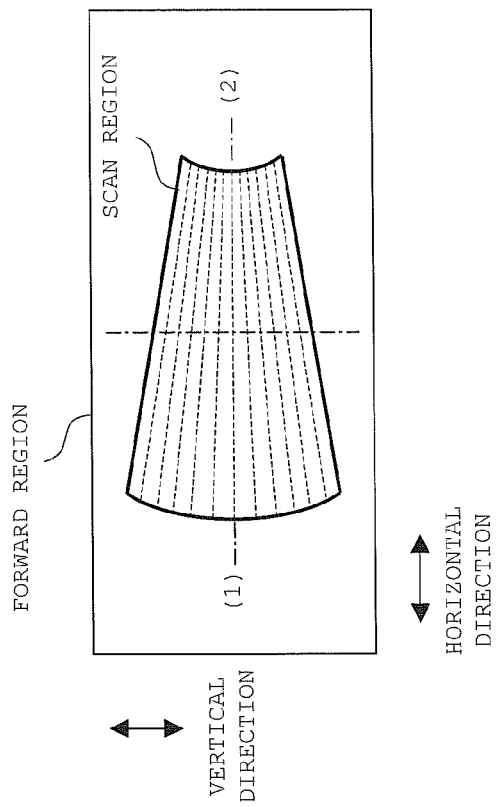
FIGS. 17A to 17C are views explaining a semiconductor laser disposing method according to a fourth embodiment of the invention.
Figure 17C:
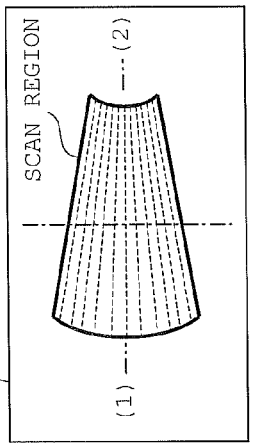
Figure 17A:
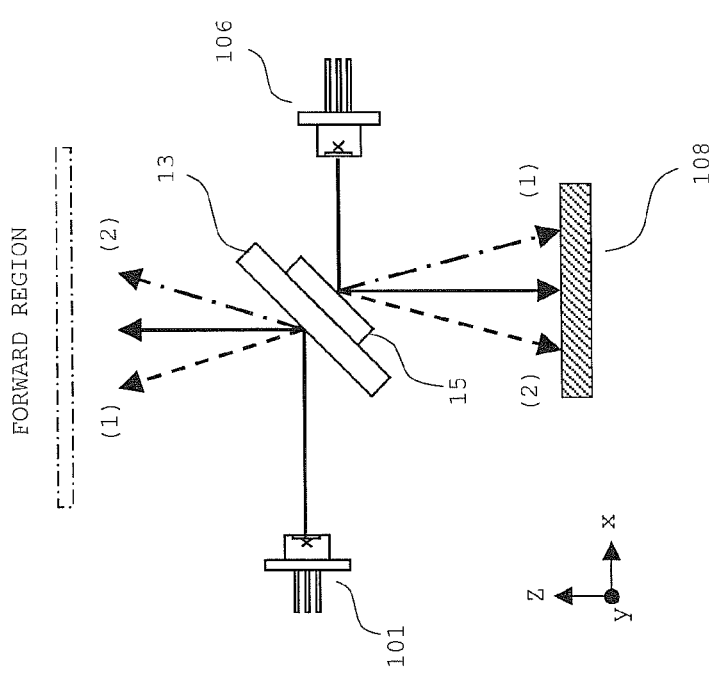

FIG. 17A schematically shows a positional relationship between the semiconductor lasers 101 and 106. The configuration of the laser radar of the fourth embodiment is identical to that of FIG. 6 except for the positional relationship between the semiconductor lasers 101 and 106. The configuration of the mirror actuator 100 of the fourth embodiment is identical to that of FIGS. 5A and 5B. In FIG. 17A, the collimator lens 102, the aberration plate 103, and the collective lens 107 are omitted for the sake of convenience.

FIGS. 17B and 17C schematically show the scan regions and scan lines of the scanning laser beam and servo laser beam when the mirror 13 is rotated about the support shafts 11 and 12 while the vertical rotation position is fixed to an arbitrary position in the configuration of FIG. 17A.

In the fourth embodiment, in order to form the scanning laser beam scan region into the rectangular shape, the mirror 13 is rotated not only in the first rotation direction centering on the support shafts 11 and 12 but also in the second rotation direction centering on the support shafts 24 and 25 during the scan of each line in the horizontal direction. Therefore, the scanning laser beam scan region is corrected from the state of FIG. 18A into the state of FIG. 18B.

Figure 18C:
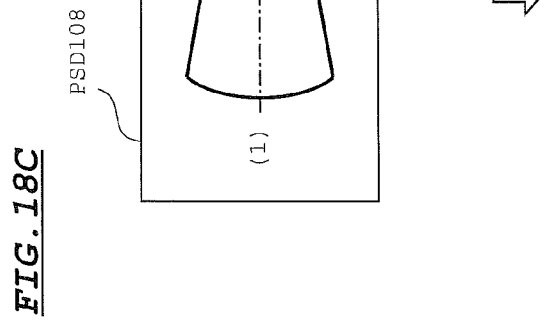
FIGS. 18A to 18D are views explaining the effect of the semiconductor laser PSD disposing method of the fourth embodiment.
Figure 18D:
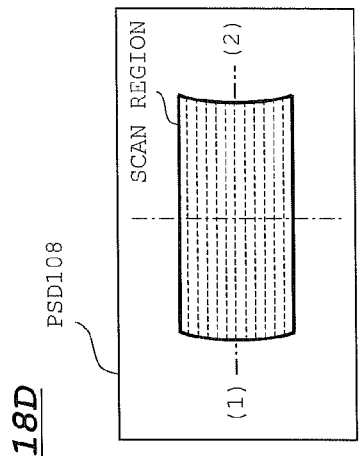
Figure 18A:
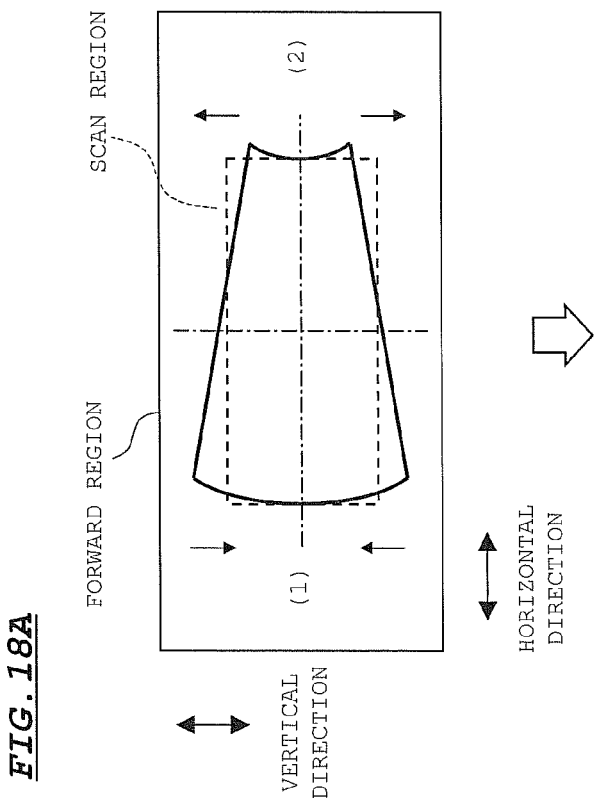
Figure 18B:
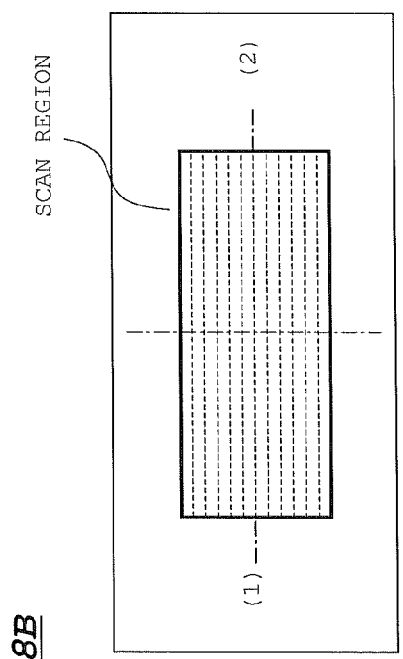

At this point, in the fourth embodiment, because the optical axes of the scanning laser beam and servo laser beam become parallel to each other when the scanning laser beam and servo laser beam are emitted from the semiconductor lasers 101 and 106, the servo laser beam scan region on the PSD light acceptance surface is corrected from the state of FIG. 18C into the state of FIG. 18D. That is, in the fourth embodiment, when the scanning laser beam scan region is corrected into the rectangular shape, the servo laser beam scan region on the PSD light acceptance surface is brought close to the rectangular shape.

Accordingly, because the servo laser beam scan region can be brought close to the rectangular shape by adjusting the positional relationship between the semiconductor lasers 101 and 106, the pitch between the servo laser beam scan lines can be expanded at the left end of the scan region, and the resolution of the PSD light acceptance surface can be improved for the servo laser beam acceptance position. Therefore, the servo laser beam acceptance position can be properly detected to smoothly and properly servo-control the scanning laser beam.

Validation Example

An effect of the fourth embodiment is validated in comparison with the comparative example.

FIGS. 17A and 8A show the optical systems of the fourth embodiment and the comparative example in the validation respectively. In the validation, the mirror 15 is disposed immediately below the mirror 13. Additionally, in the validation, it is assumed that the center position (the position to which the optical axis of the scanning laser beam is incident) of the mirror 13 and the center position (the position to which the optical axis of the scanning laser beam is incident) of the mirror 15 are vertically shifted from each other by 15 mm when the mirrors 13 and 15 are in the neutral position.

Figure 19C:
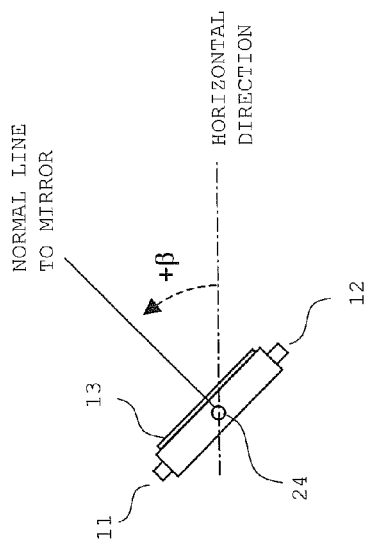
FIGS. 19A to 19C are views explaining setting conditions of a validation example of the fourth embodiment.
Figure 20A:
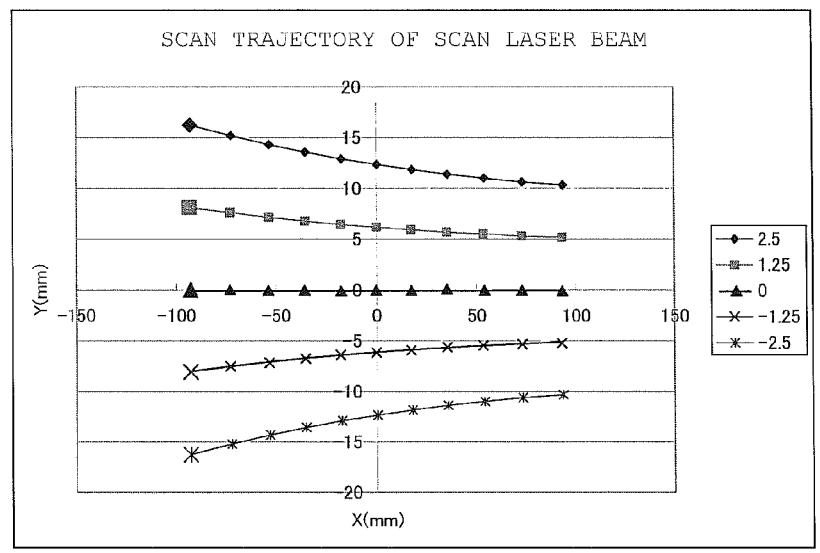
FIGS. 20A to 20C are views explaining validation result of the fourth embodiment.
Figure 20B:
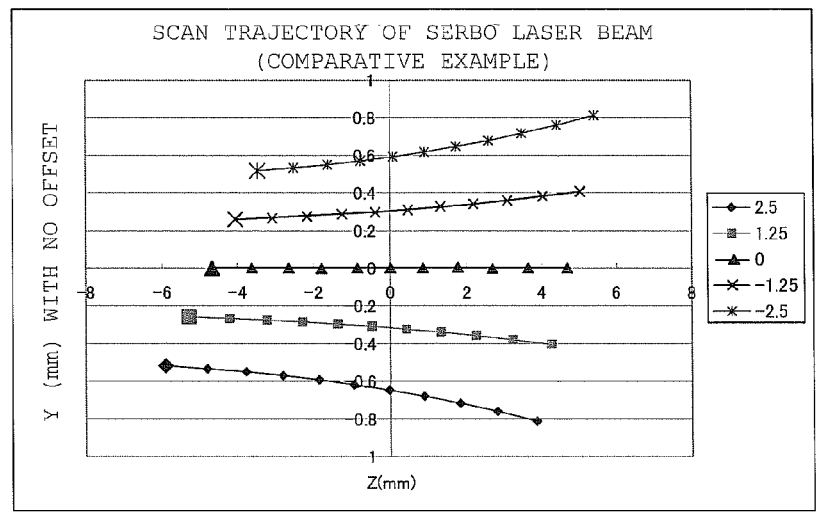
Figure 20C:
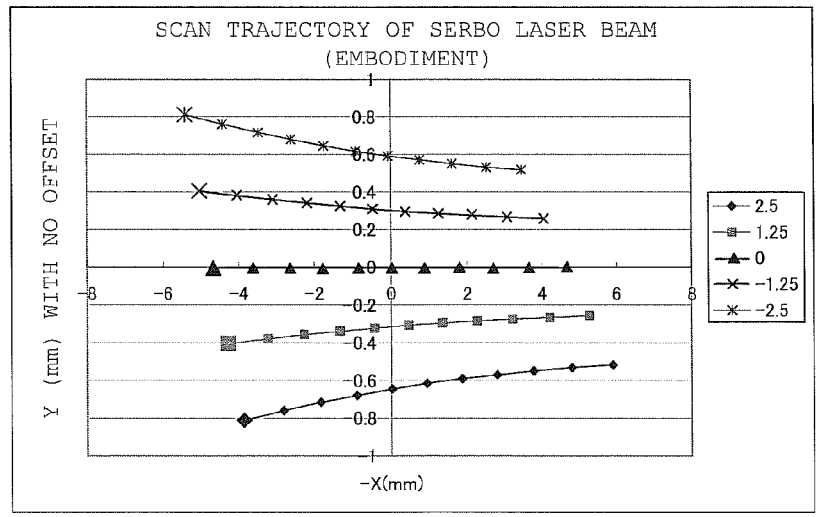

Here are other simulation conditions:
a. distance between mirror 13 and target region: 200 mm
b. distance between mirror 15 and PSD: 10 mm FIG. 20A shows a simulation of the scanning laser beam trajectory in the target region when the mirror 13 is rotated about the support shafts 11 and 12 within a range of ±12.5 degrees while inclined from the neutral position (horizontal direction) by an angle $\beta$ (upward direction is positive) as shown in FIG. 19C. FIGS. 20B and 20C show simulations of the servo laser beam scan trajectory on PSD 108 for the configurations of the comparative example and the fourth embodiment when the mirror 13 is rotated.

In FIGS. 20A to 20C, lines expressed by "2.5", "1.25", "0", "−1.25", and "−2.5" show the scan trajectories of the scanning laser beam and servo laser beam when the mirror 13 is rotated about the support shafts 11 and 12 while inclined from the neutral position toward the vertical direction by "2.5 degrees", "1.25 degrees", "0 degree", "−1.25 degrees", and "−2.5 degrees".

As shown in FIG. 20A, when the mirror 13 is rotated, the scanning laser beam scan trajectory is inclined from the horizontal direction except that the mirror 13 is not inclined in the vertical direction. At this point, as shown in FIGS. 20B to 20C, the servo light beam scan trajectories on PSD 108 do not become horizontal in the comparative example and the fourth embodiment.

Figure 19A:
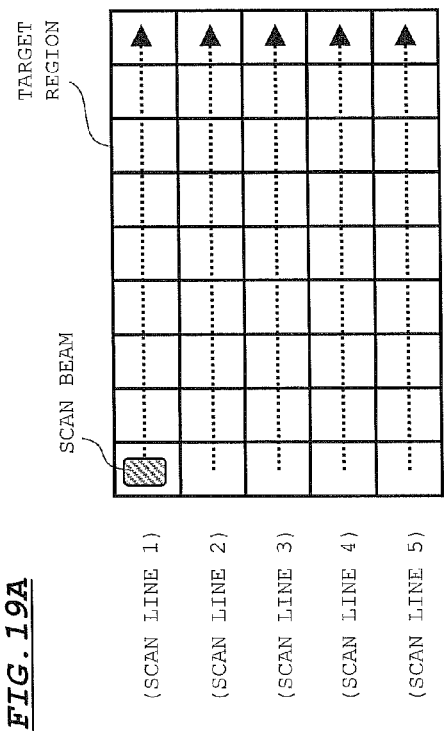
Figure 19B:
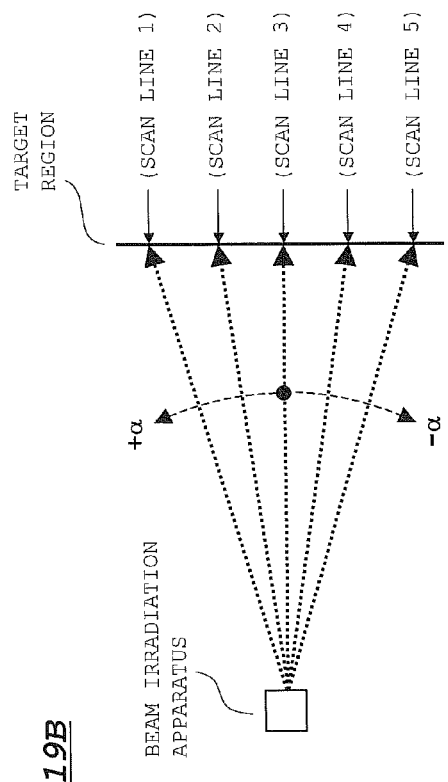
Figure 21A:
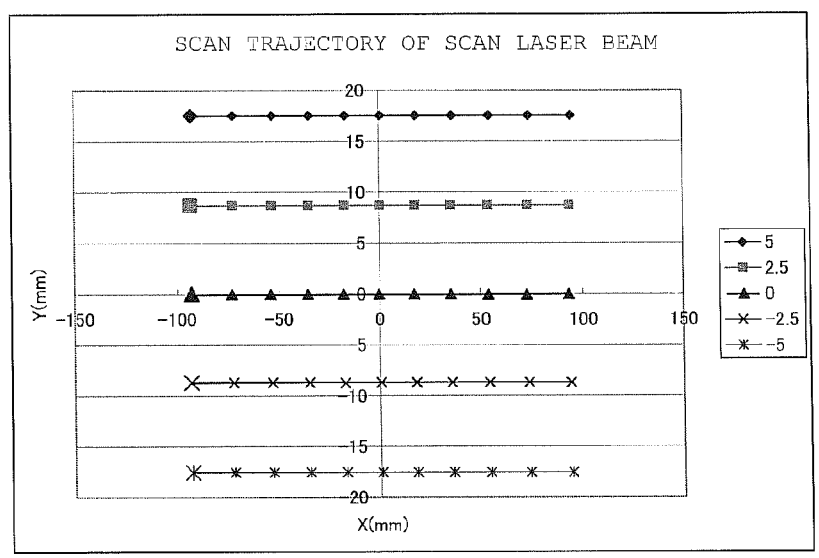
FIGS. 21A to 21C are views explaining the validation result of the fourth embodiment.
Figure 21B:
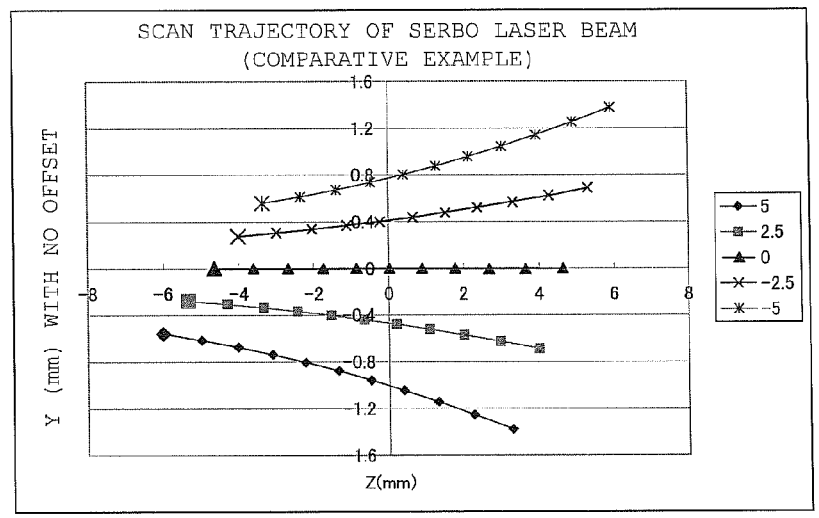
Figure 21C:
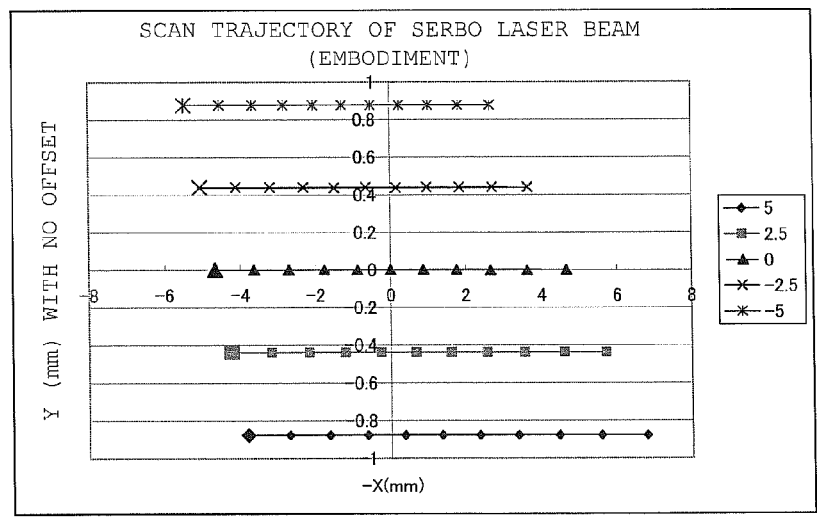

FIG. 21A shows a simulation of the scanning laser beam trajectory when the mirror actuator 100 is driven and controlled such that each scan line set in the target region is horizontally scanned with the scanning laser beam as shown in FIGS. 19A and 19B. FIGS. 21B and 21C show simulations of the servo laser beam scan trajectories on PSD 108 for the configurations of the comparative example and fourth embodiment when the mirror actuator 100 is driven and controlled.

The target region is horizontally scanned with the scanning laser beam within the range from the midpoint of each scan line of FIG. 19A to ±12.5 degrees. The vertical swing angles α of the scan line 1 and scan line 5 become +5 degrees and −5 degrees, and the vertical swing angles α of the scan line 2 and scan line 4 become +2.5 degrees and −2.5 degrees.

In FIGS. 21A to 21C, lines expressed by "5", "2.5", "0", "−2.5", and "−5" show the scan trajectories of the scanning laser beam and servo laser beam when the target region is scanned with the laser beam while the laser beam is vertically swung by "5 degrees", "2.5 degrees", "0 degree", "−2.5 degrees", and "−5 degrees". That is, the lines expressed by "5", "2.5", "0", "−2.5", and "−5" show the scan trajectories of the scanning laser beam and servo laser beam when the target region is scanned with the laser beam along the scan line 1, scan line 2, scan line 3, scan line 4, and scan line 5 of FIG. 19A.

As shown in FIG. 21B, in the comparative example, when the target region is vertically scanned with the scanning laser beam, the scan trajectories of the servo laser beam on PSD 108 do not become parallel to one another. In the comparative example, as the scan line on the target region is vertically away from the central scan line 3, the inclination of the servo light beam scan trajectory on PSD 108 is increased. In the comparative example, the inclination of the servo laser beam on PSD 108 becomes steeper compared with the case of FIG. 20B, and the resolution of the servo laser beam on PSD 108 is lowered compared with the case of FIG. 20B.

On the other hand, in the configuration of the fourth embodiment, the servo laser beam scan trajectories on PSD 108 become parallel to one another as shown in FIG. 21C. Therefore, the servo laser beam acceptance position can be properly detected to smoothly and properly servo-control the scanning laser beam.

According to the fourth embodiment, the scan region can be formed into the rectangular shape (horizontally long rectangle) by driving and controlling the mirror 13 in the above-described manner. Therefore, the lack of obstacle detection or the lack of distance measurement, caused by the deformation of the scan region from the rectangular shape, can be suppressed to properly perform the obstacle detection and the distance measurement.

Because the servo laser beam acceptance position can be properly detected by adjusting the arrangement of the semiconductor lasers 101 and 106 in the above-described manner, even if the scanning laser beam scan position is shifted due to disturbance, the scanning laser beam scan position can be turned to the desired trajectory. Accordingly, according to the fourth embodiment, the scanning laser beam scan position can smoothly follow the desired trajectory to properly perform the obstacle detection and the distance measurement. This effect can be obtained not only when optical axes of the scanning laser beam and the servo light beam become parallel to each other as the above but also when these axes substantially parallel to each other in the configuration shown in FIG. 17A.

In the fourth embodiment, as shown in FIG. 22A, the mirror 13 and the mirror 15 are disposed so as to be parallel to each other. Alternatively, as shown in FIG. 22B, even if the servo optical system from the semiconductor laser 106 to PSD 108 is disposed with the servo optical system rotated in the X-Z plane direction such that the servo optical system is inclined with respect to the mirror 13 while the positional relationship among the optical components is maintained, the same effect as the fourth embodiment is obtained. FIG. 22B shows an example of the arrangement when the servo optical system is rotated clockwise from the position of FIG. 22A.

That is, the effect of the fourth embodiment is obtained by causing the laser beam and servo light beam to impinge onto the mirror 13 and mirror 15 respectively such that an angle direction A1 (clockwise direction in FIG. 22B) from the optical axis of the scanning laser beam incident to the mirror 13 toward the optical axis of the scanning laser beam reflected by the mirror 13 matches for an angle direction A2 (clockwise direction in FIG. 22B) from the optical axis of the servo laser beam incident to the mirror 15 toward the optical axis of the servo laser beam reflected by the mirror 15.

As shown in FIG. 23A, even if the directions in which the scanning laser beam and the servo laser beam are incident to the mirrors 13 and 15 are reversed from the states of FIG. 22A, the same effect is obtained. In this case, as shown in FIG. 23B, even if the servo optical system from the semiconductor laser 104 to PSD 108 is disposed with the servo optical system rotated in the X-Z plane direction such that the servo optical system is inclined with respect to the mirror 13 while the positional relationship among the optical components is maintained, the same effect is obtained. FIG. 23B shows an example of the arrangement when the servo optical system is rotated counterclockwise from the position of FIG. 23A.

Thus, the embodiments of the invention are described. However, the invention is not limited to the embodiments, but various modifications and changes of the invention can be made.

In the embodiments, the invention is applied to the vehicle-mounted laser radar, but, for example, the invention can be applied to laser radars used in other applications such as aerosol measurement in the atmosphere. In the embodiments, the semiconductor laser is used as the light source which emits the laser beam used in the servo control. Alternatively, other light sources such as LED (Light Emitting Diode) can also be used.

The optical system used to detect the scanning laser beam scan position is not limited to the embodiments, but the scanning laser beam scan position may be detected by other techniques and configurations.

In the second and third embodiments, the scanning laser beam is incident from the horizontal direction to the mirror 13, but, for example, the scanning laser beam may be incident from the vertical direction to the mirror 13. In this case, the mirror actuator 100 is also driven and controlled such that the scanning laser beam scan trajectory becomes horizontal while the scan region becomes the rectangular shape. Although PSD is used as the photodetector in the embodiments, PD (Photodiode) may be used as the photodetector.

Furthermore, in the embodiments of the invention, various changes can be appropriately made without departing from the scope of the technical ideas disclosed claims of the invention.

What is claimed is:
1. A laser radar comprising:
a beam irradiation head which emits a laser beam; and
a control circuit which controls the beam irradiation head to perform scan in a two-dimensional direction with the laser beam,
wherein the beam irradiation head includes:
a laser beam source;
a mirror to which the laser beam emitted from the laser beam source is incident; and
a driving mechanism which rotates the mirror in first and second directions about a first rotating axis and a second rotating axis respectively, the second rotating axis being perpendicular to the first rotating axis, and wherein the control circuit controls the rotation of the mirror in the first direction and the second direction such that a scan region of the laser beam becomes a rectangular shape.

2. The laser radar according to claim 1, wherein the laser beam is incident to the mirror from a horizontal direction or a vertical direction.

3. The laser radar according to claim 1, wherein the beam irradiation head includes:
a photodetector which supplies a signal according to a light acceptance position; and
a servo optical system which changes a servo light beam irradiation position on the photodetector according to a rotation position of the mirror, and
wherein the control circuit compares a trajectory of the servo light beam and the irradiation position of the servo light beam, the trajectory of the servo light beam being detected on the photodetector when the mirror is driven such that the laser beam scan region becomes the rectangular shape, the irradiation position of the servo light beam being detected based on a signal from the photodetector during actual operation, and the control circuit controls drive of the mirror such that the irradiation position follows the trajectory.

4. The laser radar according to claim 3, wherein the servo optical system includes:
an optical element which is rotated according to the rotation of the mirror;
a servo light source which emits a servo light beam; and
a photodetector which supplies a signal according to a light acceptance position while accepting the servo light beam through the optical element,
wherein the photodetector is disposed while inclined from a state, in which a light acceptance surface of the photodetector is orthogonal to an optical axis of the servo light beam when the mirror is located at a neutral position, toward a direction in which a deformation of the servo light beam scan region is suppressed on the light acceptance surface when the control circuit controls the rotation of the mirror.

5. The laser radar according to claim 4, wherein the optical element includes a plate-shape reflecting surface to which the servo light beam is incident.

6. The laser radar according to claim 3, wherein the servo optical system includes:
an optical element which is rotated according to the rotation of the mirror;
a servo light source which emits a servo light beam; and
a photodetector which supplies a signal according to a light acceptance position while accepting the servo light beam through the optical element, and
wherein the laser beam and the servo light beam are respectively incident to the mirror and the optical element such that optical axes of the laser beam and the servo light beam become parallel or substantially parallel to each other.

7. The laser radar according to claim 6, wherein the laser beam and the servo light beam are incident to the mirror and the optical element from opposite directions.

8. The laser radar according to claim 6, wherein the optical element includes a plate-shape reflecting surface to which the servo light beam is incident.

9. The laser radar according to claim 1, wherein the beam irradiation head includes:
a laser beam source;
a scan mirror to which the laser beam emitted from the laser beam source is incident;
a driving mechanism which rotates the scan mirror in first and second directions about a first rotating axis and a second rotating axis respectively, the second rotating axis being perpendicular to the first rotating axis;
a servo mirror which is rotated according to the rotation of the scan mirror;
a servo light source which emits a servo light beam to the servo mirror; and
a photodetector which accepts the servo light beam reflected by the servo mirror and supplies a signal according to an acceptance position of the servo light beam, and
wherein the laser beam and the servo light beam are respectively incident to the scan mirror and the servo mirror such that an angle direction from an optical axis of the laser beam incident to the scan mirror toward an optical axis of the laser beam reflected by the scan mirror matches for an angle direction from an optical axis of the servo light beam incident to the servo mirror toward an optical axis of the servo light beam incident to the servo mirror.

10. A beam irradiation apparatus for a laser radar, the beam irradiation apparatus comprising:
a laser beam source;
a mirror to which the laser beam emitted from the laser beam source is incident;
a driving mechanism which rotates the mirror in first and second directions about a first rotating axis and a second rotating axis respectively, the second rotating axis being perpendicular to the first rotating axis;
a control circuit which controls the driving mechanism to perform scan in a two-dimensional direction with the laser beam,
wherein the control circuit controls the rotation of the mirror in the first direction and the second direction such that a scan region of the laser beam becomes a rectangular shape.

11. The beam irradiation apparatus according to claim 10, wherein the laser beam is incident to the mirror from a horizontal direction or a vertical direction.

12. The beam irradiation apparatus according to claim 10, comprising:
a photodetector which supplies a signal according to a light acceptance position; and
a servo optical system which changes a servo light beam irradiation position on the photodetector according to a rotation position of the mirror,
wherein the control circuit compares a trajectory of the servo light beam and the irradiation position of the servo light beam, the trajectory of the servo light beam being detected on the photodetector when the mirror is driven such that the laser beam scan region becomes the rectangular shape, the irradiation position of the servo light beam being detected based on a signal from the photodetector during actual operation, and the control circuit controls drive of the mirror such that the irradiation position follows the trajectory.

13. The beam irradiation apparatus according to claim 12, wherein the servo optical system includes:
an optical element which is rotated according to the rotation of the mirror;
a servo light source which emits a servo light beam; and
a photodetector which supplies a signal according to a light acceptance position while accepting the servo light beam through the optical element, and
wherein the photodetector is disposed while inclined from a state, in which a light acceptance surface of the photodetector is orthogonal to an optical axis of the servo light beam when the mirror is located at a neutral position, toward a direction in which a deformation of the servo light beam scan region is suppressed on the light acceptance surface when the control circuit controls the rotation of the mirror.

14. The beam irradiation apparatus according to claim 13, wherein the optical element includes a plate-shape reflecting surface to which the servo light beam is incident.

15. The beam irradiation apparatus according to claim 12, wherein the servo optical system includes:
   an optical element which is rotated according to the rotation of the mirror;
   a servo light source which emits a servo light beam; and
   a photodetector which supplies a signal according to a light acceptance position while accepting the servo light beam through the optical element, and
   wherein the laser beam and the servo light beam are respectively incident to the mirror and the optical element such that optical axes of the laser beam and the servo light beam become parallel or substantially parallel to each other.

16. The beam irradiation apparatus according to claim 15, wherein the laser beam and the servo light beam are incident to the mirror and the optical element from opposite directions.

17. The beam irradiation apparatus according to claim 15, wherein the optical element includes a plate-shape reflecting surface to which the servo light beam is incident.

18. A beam irradiation apparatus for a laser radar, the beam irradiation apparatus comprising:
   a laser beam source;
   a scan mirror to which the laser beam emitted from the laser beam source is incident;
   a driving mechanism which rotates the scan mirror in first and second directions about a first rotating axis and a second rotating axis respectively, the second rotating axis being perpendicular to the first rotating axis;
   a servo mirror which is rotated according to the rotation of the scan mirror;
   a servo light source which emits a servo light beam to the servo mirror; and
   a photodetector which accepts the servo light beam reflected by the servo mirror and supplies a signal according to an acceptance position of the servo light beam,
   wherein the laser beam and the servo light beam are respectively incident to the scan mirror and the servo mirror such that an angle direction from an optical axis of the laser beam incident to the scan mirror toward an optical axis of the laser beam reflected by the scan mirror matches for an angle direction from an optical axis of the servo light beam incident to the servo mirror toward an optical axis of the servo light beam incident to the servo mirror.

* * * * *